(12) United States Patent
Sun

(10) Patent No.: US 11,943,662 B2
(45) Date of Patent: Mar. 26, 2024

(54) LINK QUALITY OBTAINING METHOD AND APPARATUS

(71) Applicant: HUAWEI TECHNOLOGIES CO., LTD., Guangdong (CN)

(72) Inventor: Dekui Sun, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 53 days.

(21) Appl. No.: 16/985,926

(22) Filed: Aug. 5, 2020

(65) Prior Publication Data

US 2020/0367110 A1    Nov. 19, 2020

Related U.S. Application Data

(63) Continuation of application No. PCT/CN2019/072165, filed on Jan. 17, 2019.

(30) Foreign Application Priority Data

Feb. 5, 2018   (CN) .......................... 201810113929.3

(51) Int. Cl.
*H04W 28/24*   (2009.01)
*H04L 43/0852*   (2022.01)
(Continued)

(52) U.S. Cl.
CPC ......... *H04W 28/24* (2013.01); *H04L 43/0852* (2013.01); *H04L 43/16* (2013.01); *H04W 24/08* (2013.01); *H04W 28/0268* (2013.01)

(58) Field of Classification Search
CPC . H04W 28/24; H04W 28/0268; H04W 24/08; H04W 24/10; H04L 43/0852;
(Continued)

(56) References Cited

U.S. PATENT DOCUMENTS

2008/0056125 A1 *   3/2008   Kneckt ............... H04W 74/002
                                                         370/229
2013/0326551 A1 *   12/2013   Chatterjee ............ H04W 36/22
                                                         725/9
(Continued)

FOREIGN PATENT DOCUMENTS

CN        104412648 A      3/2015
CN        105337658 A      2/2016
(Continued)

OTHER PUBLICATIONS

Nokia et al., "5G QoS fixes for URLLC services related attributes—PDB, PER, MDB, 5QI ," SA WG2 Meeting #125, S2-180474, Goethenburg, Sweden, Jan. 22-26, 2018, 5 pages.
(Continued)

*Primary Examiner* — Anh Vu H Ly
*Assistant Examiner* — Hector Reyes
(74) *Attorney, Agent, or Firm* — Fish & Richardson P.C.

(57) ABSTRACT

This application provides a link quality obtaining method and apparatus. One method performed by a session management network element includes: determining a monitoring link for monitoring quality of service (QoS) of a service path between a first communications device and a second communications device; sending a first link quality reporting request to the first communications device, wherein the first link quality reporting request indicates the first communications device to report QoS information of the service path in response to one or more reporting conditions being satisfied; and receiving a first link quality notification message from the first communications device, wherein the first link quality notification message comprises the QoS information and an identifier of the monitoring link.

21 Claims, 7 Drawing Sheets

(51) Int. Cl.
*H04L 43/16* (2022.01)
*H04W 24/08* (2009.01)
*H04W 28/02* (2009.01)

(58) Field of Classification Search
CPC ..... H04L 43/16; H04L 43/08; H04L 43/0829; H04L 43/087; H04L 41/5009
See application file for complete search history.

(56) References Cited

U.S. PATENT DOCUMENTS

| | | | |
|---|---|---|---|
| 2014/0050151 A1 | 2/2014 | Riddington et al. | |
| 2014/0254398 A1 | 9/2014 | Li et al. | |
| 2017/0150384 A1 | 5/2017 | Rune et al. | |
| 2017/0238148 A1* | 8/2017 | Kolan | H04L 41/5029 370/312 |
| 2017/0359749 A1 | 12/2017 | Dao | |
| 2017/0373950 A1 | 12/2017 | Szilagyi et al. | |
| 2019/0116486 A1* | 4/2019 | Kim | H04W 8/10 |
| 2019/0215731 A1* | 7/2019 | Qiao | H04L 43/087 |
| 2020/0366794 A1* | 11/2020 | Lee | H04W 48/16 |
| 2021/0014734 A1* | 1/2021 | Liu | H04W 28/0942 |
| 2021/0153070 A1* | 5/2021 | Velev | H04W 76/12 |
| 2021/0289393 A1* | 9/2021 | Yao | H04L 43/0864 |

FOREIGN PATENT DOCUMENTS

| | | |
|---|---|---|
| CN | 106686680 A | 5/2017 |
| CN | 106712989 A | 5/2017 |
| CN | 106789660 A | 5/2017 |
| CN | 107431638 A | 12/2017 |
| EP | 3273634 A1 | 1/2018 |
| EP | 3297318 A1 | 3/2018 |
| WO | 2005074312 A1 | 8/2005 |
| WO | 2016185986 A1 | 11/2016 |

OTHER PUBLICATIONS

3GPP TS 23.501 V15.0.0 (Dec. 2017), "3rd Generation Partnership Project; Technical Specification Group Services and System Aspects; System Architecture for the 5G System; Stage 2 (Release 15)," Dec. 2017, 181 pages.

Huawei et al., "TS 23.501: URLLC traffic model and QoS parameters," SA WG2 Meeting #124, S2-179318, Reno, USA, Nov. 27-Dec. 1, 2017, 6 pages.

3GPP TS 29.244 V15.0.0 (Dec. 2017), "3rd Generation Partnership Project; Technical Specification Group Core Network and Terminals; Interface between the Control Plane and the User Plane Nodes; Stage 3 (Release 15)," Dec. 2017, 157 pages.

Huawei et al., "TS 23.501: URLLC traffic model and QoS parameters," SA WG2 Meeting #124, S2-178901, Nov. 27-Dec. 1, 2017, Reno, USA, 6 pages.

Office Action issued in Chinese Application No. 201810113929.3 dated Mar. 4, 2020, 7 pages.

PCT International Search Report and Written Opinion issued in International Application No. PCT/CN2019/072165 dated Apr. 17, 2019, 13 pages (with English translation).

Extended European Search Report issued in European Application No. 19747707.8 dated Feb. 8, 2021, 9 pages.

Office Action issued in Indian Application No. 202047034951 dated Sep. 10, 2021, 7 pages.

* cited by examiner

LINK QUALITY OBTAINING METHOD AND APPARATUS

CROSS-REFERENCE TO RELATED APPLICATIONS

This application is a continuation of International Patent Application No. PCT/CN2019/072165, filed on Jan. 17, 2019, which claims priority to Chinese Patent Application No. 201810113929.3, filed on Feb. 5, 2018. The disclosures of the aforementioned applications are hereby incorporated by reference in their entireties.

TECHNICAL FIELD

This application relates to the communications field, and more specifically, to a link quality obtaining method and apparatus.

BACKGROUND

A 5th generation (5G) communications system introduces ultra-reliable low latency communication (URLLC) services, mainly including services that require a low latency and a highly reliable connection, such as unmanned driving and industrial automation. For a low-latency and high-reliability service, a network needs to obtain quality of service (QoS) in a timely manner. In the prior art, a radio access network (RAN) reports a sending rate. This manner cannot meet a requirement of the URLLC service.

To obtain network performance and quality of service, a 5G network introduces a link quality awareness protocol (LQAP) for the URLLC service. How to notify a network side of a quality of service event of a terminal and a user plane network element to improve a link quality awareness capability of the network side becomes an urgent problem that needs to be resolved currently.

SUMMARY

This application provides a link quality obtaining method and apparatus, so that a first device reports quality of service information of a monitoring link when a reporting policy is met, thereby helping a network side obtain network performance.

According to a first aspect, a link quality obtaining method is provided, including: determining, by a session management network element, a monitoring link, where the monitoring link is used to detect quality of service of a service path between a first communications device and a second communications device; then sending a first link quality reporting request to the first device, where the first link quality reporting request is used to indicate the first device to report quality of service information of the monitoring link when a reporting policy is met, and the first device includes the first communications device and/or the second communications device; and receiving a first link quality notification message from the first device, where the first link quality notification message includes the quality of service information and an identifier of the monitoring link, so that the first device reports the quality of service information when the reporting policy is met, thereby helping a network side obtain network performance.

Optionally, the monitoring link may be replaced by: a QoS monitoring link, a QoS detection link, a QoS monitoring connection, a QoS detection connection, a QoS detection session, a QoS monitoring session, an LQAP connection, an LQAP session, an NCP link, an NCP monitoring link, an NCP connection, an NCP session, and other similar expressions that can detect the quality of service.

Optionally, "detect" in the sentence that the monitoring link is used to detect quality of service of a service path between a first communications device and a second communications device may be replaced by another similar expression that has a function of obtaining quality of service of a link, such as monitor, supervise, measure, calculate, evaluate, or determine.

Optionally, the link quality reporting request may be replaced by another description having a similar function, such as a link quality subscription message, a link quality subscription notification, a link quality notification request, or a link quality event subscription.

Optionally, the link quality notification message may be replaced by another description having a similar function, such as a link quality response message, a link quality subscription response notification, a link quality notification response, or a link quality event subscription response.

Optionally, the quality of service of the service path may be equivalently replaced by: quality of the service path, transmission quality or quality of service of a service corresponding to the service path, transmission quality of the service path, quality of service performance of a service transmitted on the service path, transmission quality of a service transmitted on the service path (for example, quality of service performance of a data packet transmitted on a service path on which a detection packet is actually transmitted), and other similar expressions that can be derived.

In a possible implementation, the quality of service information includes a quality of service parameter of the service path and/or a link status notification message, and the link status notification message is used to indicate that the quality of service parameter of the service path meets the reporting policy. This specifically means that the first device reports the link status notification message to the session management network element when detecting that the quality of service parameter of the service path meets the reporting policy.

In a possible implementation, the quality of service information is obtained by the first communications device or the second communications device by sending a detection packet. The quality of service information corresponds to actual transmission performance of the detection packet. In this way, the quality of service information may be determined based on an arrival status of the detection packet.

In a possible implementation, the first link quality reporting request includes a link quality reporting period. The reporting policy indicates that the first device reports the quality of service information based on the link quality reporting period. In this way, the session management network element may obtain the quality of service of the service path in real time, to implement real-time monitoring on the monitoring link, so that adjustment can be performed in a timely manner when a fault occurs.

In another possible implementation, when the quality of service information is the quality of service parameter of the service path, that the first device meets the reporting policy indicates that the first device detects that the quality of service parameter meets one or more of the following conditions:

a latency parameter of the service path is greater than or equal to a latency threshold, where the quality of service parameter includes the latency parameter;

a packet loss rate of the service path is greater than or equal to a packet loss rate threshold, where the quality of service parameter includes the packet loss rate; and a jitter parameter of the service path is greater than or equal to a jitter threshold, where the quality of service parameter includes the jitter parameter.

Therefore, reported quality of service parameters are comprehensive, specifically include the packet loss rate, a latency, and a jitter, and can reflect the quality of service of the link from a plurality of perspectives.

Optionally, the latency threshold, the packet loss rate threshold, or the jitter threshold is determined by the first device based on a service requirement. Alternatively, the first link quality reporting request includes one or more of the latency threshold, the packet loss rate threshold, and the jitter threshold. Therefore, a threshold of the quality of service parameter may be determined by the first device, or may be delivered by the session management network element to the first device.

Optionally, the latency threshold includes an uplink latency threshold and/or a downlink latency threshold. The packet loss rate threshold includes an uplink packet loss rate threshold and/or a downlink packet loss rate threshold. The jitter threshold includes an uplink jitter threshold and/or a downlink jitter threshold. Therefore, the session management network element may obtain not only a quality of service parameter reported by a terminal, but also a quality of service parameter reported by a user plane network element, so that the quality of service of the link can be comprehensively understood.

In a possible implementation, the determining, by a session management network element, a monitoring link includes: receiving, by the session management network element, a second link quality reporting request from an application network element, where the second link quality reporting request includes an identifier of a service corresponding to the service path; and determining the monitoring link based on the identifier of the service. The service corresponding to the service path may be understood as a service transmitted on the service path. In other words, the service is transmitted by using the service path. Optionally, a specific representation form of the identifier of the service may be one or more of the following: an IP 5-tuple, a terminal address, an application address, an application identifier, a terminal identifier, a service flow identifier, a service aggregation flow identifier, a packet data unit (PDU) session ID, and a QoS flow ID.

In a possible implementation, the method further includes: sending, by the session management network element, a second link quality notification message to the application network element, where the second link quality notification message includes the quality of service information. In this way, the application network element can also learn of transmission performance of the link in a timely manner, to make corresponding adjustments in a timely manner when a fault occurs.

In a possible implementation, the method further includes: determining, by the session management network element when receiving the first link quality notification message, that a network status is any one of wireless handover, user plane function UPF reselection, and packet data unit PDU session establishment or reestablishment; and determining, by the session management network element, not to send the second link quality notification message to the application network element. Therefore, the session management network element may determine, with reference to the network status, not to send the second link quality notification message to the application network element, and does not need to send the second link quality notification message in an unnecessary case, thereby reducing power consumption and communication overheads.

In a possible implementation, when the first link quality reporting request includes one or more of a link quality reporting period, a latency threshold, a packet loss rate threshold, and a jitter threshold, the method further includes: determining, by the session management network element, that the reporting policy needs to be updated; and sending, by the session management network element, a first update message to the first device, where the first update message is used to indicate the first device to update the reporting policy, and the first update message includes one or more of a link quality reporting period update value, a latency threshold update value, a packet loss rate threshold update value, and a jitter threshold update value. Therefore, the session management network element may update the reporting policy in a timely manner, to meet a quality of service requirement of the service. The first update message carries an identifier of a monitoring link. The first update message carrying an identifier of a monitoring link is intended to help the first device search for a monitoring link whose reporting policy needs to be updated, or search for a local context that is of the monitoring link and that corresponds to the identifier of the monitoring link.

In another possible implementation, the method further includes: receiving, by the session management network element, a second update message from the application network element, where the second update message carries the identifier of the service, and the second update message includes one or more of a link quality reporting period update value, a latency threshold update value, a packet loss rate threshold update value, and a jitter threshold update value.

The determining, by the session management network element, that the reporting policy needs to be updated includes: determining, by the session management network element, the monitoring link based on the identifier of the service; and determining, by the session management network element, that the reporting policy of the monitoring link needs to be updated. Therefore, the session management network element may determine, based on an indication of the application network element, to update the reporting policy. An update manner is relatively flexible.

In another possible implementation, the determining, by a session management network element, a monitoring link includes: determining, by the session management network element based on a quality of service requirement of a service, an identifier of the service corresponding to the service path; and determining, by the session management network element, the monitoring link based on the identifier of the service. In this way, the session management network element may determine the monitoring link based on the quality of service requirement of the service.

In another possible implementation, the determining, by a session management network element, of a monitoring link includes:

receiving, by the session management network element, reporting indication information from a policy control network element, where the reporting indication information is used to report the quality of service information; determining, by the session management network element based on the reporting indication information, an identifier of a service corresponding to the service path; and determining, by the session management network element, the monitoring link based on the identifier of the service. In this way, the session management network element may determine the monitoring link based on an indication of the policy control network element.

In a possible implementation, the determining, by the session management network element, the monitoring link based on the identifier of the service includes: determining, by the session management network element based on the identifier of the service, context information corresponding to the service; and determining, by the session management network element, the monitoring link based on the context information. The context information includes the identifier of the monitoring link.

In a possible implementation, the method further includes: evaluating, by the session management network element, link quality of the monitoring link based on the first link quality notification message; and sending, by the session management network element, a repair indication to the first device based on an evaluation result, where the repair indication is used to indicate the first device to optimize or repair the service path, for example, indicate the first device to perform bicasting. Therefore, the session management network element may further indicate the first device to optimize a transmission link, to help improve reliability of the transmission link.

According to a second aspect, a communications system is provided, including: determining, by a session management network element, a monitoring link, where the monitoring link is used to detect quality of service of a service path between a first device and the second device; sending, by the session management network element, a first link quality reporting request to the first device, where the first link quality reporting request is used to indicate the first device to report quality of service information of the service path when a reporting policy is met; and sending, by the first device, a first link quality notification message to the session management network element, where the first link quality notification message includes the quality of service information and an identifier of the monitoring link.

In the communications system in this embodiment of this application, the session management network element determines the monitoring link, where the monitoring link is used to detect the quality of service of the service path between the first device and the second device, and sends the first link quality reporting request to the first device, so that the first device reports the quality of service information of the service path when the reporting policy is met, thereby helping a network side obtain network performance.

Optionally, the first device is a terminal or a user plane network element (for example, a UPF).

In a possible implementation, the quality of service information is obtained by the first device or a peer end of the first device by sending a detection packet. In this way, the quality of service information may be determined based on an arrival status of the detection packet.

In a possible implementation, the first link quality reporting request includes a link quality reporting period. The reporting policy indicates that the first device reports the quality of service information based on the link quality reporting period. In this way, the session management network element may obtain quality of service of the link in real time, to implement real-time monitoring on the monitoring link, so that adjustment can be performed in a timely manner when a fault occurs.

In another possible implementation, when the quality of service information is a quality of service parameter of the service path, that the first device meets the reporting policy indicates that the first device detects that the quality of service parameter meets one or more of the following conditions:

a latency parameter of the service path is greater than or equal to a latency threshold, where the quality of service parameter includes the latency parameter;

a packet loss rate of the service path is greater than or equal to a packet loss rate threshold, where the quality of service parameter includes the packet loss rate; and a jitter parameter of the service path is greater than or equal to a jitter threshold, where the quality of service parameter includes the jitter parameter.

Therefore, reported quality of service parameters are comprehensive, specifically include the packet loss rate, a latency, and a jitter, and can reflect the quality of service of the service path from a plurality of perspectives.

Optionally, the latency threshold, the packet loss rate threshold, or the jitter threshold is determined by the first device based on a service requirement. Alternatively, the first link quality reporting request includes one or more of the latency threshold, the packet loss rate threshold, and the jitter threshold. Therefore, a threshold of the quality of service parameter may be determined by the first device, or may be delivered by the session management network element to the first device.

In a possible implementation, the latency threshold includes an uplink latency threshold and/or a downlink latency threshold. The packet loss rate threshold includes an uplink packet loss rate threshold and/or a downlink packet loss rate threshold. The jitter threshold includes an uplink jitter threshold and/or a downlink jitter threshold. Therefore, the session management network element may obtain not only quality of service information reported by a terminal, but also quality of service information reported by a user plane network element, so that the quality of service of the link can be comprehensively understood.

In a possible implementation, the method further includes: sending, by an application network element, a second link quality reporting request to the session management network element, where the second link quality reporting request includes an identifier of a service corresponding to the service path; and the determining, by the session management network element, a monitoring link includes: determining, by the session management network element, the monitoring link based on the identifier of the service.

In a possible implementation, the method further includes: sending, by the session management network element, a second link quality notification message to the application network element, where the second link quality notification message includes the quality of service information.

In a possible implementation, when the first link quality reporting request includes one or more of a link quality reporting period, a latency threshold, a packet loss rate threshold, and a jitter threshold, the method further includes: determining, by the session management network element, that the reporting policy needs to be updated; and sending, by the session management network element, a first update message to the first device, where the first update message is used to indicate to update the reporting policy, and the first update message includes one or more of a link quality reporting period update value, a latency threshold update value, a packet loss rate threshold update value, and a jitter threshold update value. Therefore, the session management network element may update the reporting policy in a timely manner, to meet a quality of service requirement of the service. The first update message carries an identifier of a monitoring link. The first update message carrying an identifier of a monitoring link is intended to help the first device search for a monitoring link that needs to be updated.

In another possible implementation, the method further includes: sending, by the application network element, a second update message to the session management network element, where the second update message carries the identifier of the service, and the second update message includes one or more of a link quality reporting period update value, a latency threshold update value, a packet loss rate threshold update value, and a jitter threshold update value. Therefore, the session management network element may determine, based on an indication of the application network element, to update the reporting policy. An update manner is relatively flexible.

According to a third aspect, a link quality obtaining method is provided, including: receiving, by a first device, a first link quality reporting request from a session management network element, where the first link quality reporting request is used to indicate the first device to report quality of service information of a service path when it is detected that a monitoring link meets a reporting policy, and the monitoring link is used to detect quality of service of a service path between the first device and a peer end of the first device; and sending, by the first device, a first link quality notification message to the session management network element when the reporting policy is met, where the first link quality notification message includes the quality of service information and an identifier of the monitoring link.

The first device receives the first link quality reporting request sent by the session management network element, and reports the quality of service information of the service path when the reporting policy is met, where the first link quality notification message includes the quality of service information and the identifier of the monitoring link, thereby helping a network side obtain network performance.

Optionally, the quality of service information includes a quality of service parameter and/or a link status notification message, and the link status notification message is used to indicate that the quality of service parameter of the service path meets the reporting policy.

In a possible implementation, the method further includes: determining, by the first device, the quality of service information by sending a detection packet to the peer end of the first device. In this way, the quality of service information may be determined based on an arrival status of the detection packet.

In a possible implementation, the first link quality reporting request includes a link quality reporting period.

The sending, by the first device, a first link quality notification message to the session management network element when the reporting policy is met includes: sending, by the first device, the first link quality notification message to the session management network element based on the link quality reporting period. In this way, the session management network element may obtain quality of service of the link in real time, to implement real-time monitoring on the monitoring link, so that adjustment can be performed in a timely manner when a fault occurs.

In another possible implementation, the quality of service information is a quality of service parameter of the service path, and the sending, by the first device, a first link quality notification message to the session management network element when the reporting policy is met includes:

sending the first link quality notification message to the session management network element when the first device detects that the quality of service parameter meets one or more of the following conditions:

a latency parameter of the service path is greater than or equal to a latency threshold, where the quality of service parameter includes the latency parameter;

a packet loss rate of the service path is greater than or equal to a packet loss rate threshold, where the quality of service parameter includes the packet loss rate; and a jitter parameter of the service path is greater than or equal to a jitter threshold, where the quality of service parameter includes the jitter parameter.

Therefore, quality of service parameters reported by the first device are comprehensive, specifically include the packet loss rate, a latency, and a jitter, and can reflect the quality of service of the service path from a plurality of perspectives.

Optionally, the latency threshold, the packet loss rate threshold, or the jitter threshold is determined by the first device based on a service requirement. Alternatively, the first link quality reporting request includes one or more of the latency threshold, the packet loss rate threshold, and the jitter threshold. Therefore, a threshold of the quality of service parameter may be determined by the first device, or may be delivered by the session management network element to the first device.

In a possible implementation, when the first link quality reporting request includes one or more of a link quality reporting period, a latency threshold, a packet loss rate threshold, and a jitter threshold, the method further includes: obtaining and receiving, by the first device, a first update message from the session management network element, where the first update message is used to indicate to update the reporting policy, and the first update message includes one or more of a link quality reporting period update value, a latency threshold update value, a packet loss rate threshold update value, and a jitter threshold update value.

In a possible implementation, the method further includes: receiving, by the first device, a repair indication from the session management network element, where the repair indication is used to indicate the first device to optimize the service path; and optimizing, by the first device, the service path.

In a possible implementation, the first device is a terminal or a user plane function UPF network element.

According to a fourth aspect, a link quality obtaining apparatus is provided. The apparatus may be a session management network element or a chip. The apparatus has a function of implementing the session management network element in any aspect or any possible implementation of any aspect. The function may be implemented by hardware, or by hardware executing corresponding software. The hardware or software includes one or more modules corresponding to the foregoing function.

According to a fifth aspect, a link quality obtaining apparatus is provided. The apparatus may be a first device or a chip. The apparatus has a function of implementing the first device in any aspect or any possible implementation of any aspect. The function may be implemented by hardware, or by hardware executing corresponding software. The hardware or software includes one or more modules corresponding to the foregoing function.

According to a sixth aspect, an apparatus is provided. The apparatus includes a processor, a memory, and a transceiver. The processor is connected to the memory and the transceiver. The memory is configured to store an instruction, the processor is configured to execute the instruction, and the transceiver is configured to communicate with another network element under control of the processor. When the processor executes the instruction stored in the memory, the execution enables the apparatus to perform the method of the session management network element in any one of the foregoing aspects or any possible implementation of any one of the foregoing aspects. It should be noted that the memory may be integrated into the processor, or may be independent of the processor.

According to a seventh aspect, an apparatus is provided. The apparatus includes a processor, a memory, and a transceiver. The processor is connected to the memory and the transceiver. The memory is configured to store an instruction, the processor is configured to execute the instruction, and the transceiver is configured to communicate with another network element under control of the processor. When the processor executes the instruction stored in the memory, the execution enables the apparatus to perform the method of the terminal in any one of the foregoing aspects or any possible implementation of any one of the foregoing aspects. It should be noted that the memory may be integrated into the processor, or may be independent of the processor.

According to an eighth aspect, an apparatus is provided. The apparatus includes a processor, a memory, and a transceiver. The processor is connected to the memory and the transceiver. The memory is configured to store an instruction, the processor is configured to execute the instruction, and the transceiver is configured to communicate with another network element under control of the processor. When the processor executes the instruction stored in the memory, the execution enables the apparatus to perform the method of the user plane network element in any one of the foregoing aspects or any possible implementation of any one of the foregoing aspects. It should be noted that the memory may be integrated into the processor, or may be independent of the processor.

According to a ninth aspect, an apparatus is provided. The apparatus includes a processor, a memory, and a transceiver. The processor is connected to the memory and the transceiver. The memory is configured to store an instruction, the processor is configured to execute the instruction, and the transceiver is configured to communicate with another network element under control of the processor. When the processor executes the instruction stored in the memory, the execution enables the apparatus to perform the method of the application network element in any one of the foregoing aspects or any possible implementation of any one of the foregoing aspects. It should be noted that the memory may be integrated into the processor, or may be independent of the processor.

According to a tenth aspect, a computer-readable storage medium is provided. The computer-readable storage medium stores a program. The program enables a session management network element to perform the method of the session management network element in any one of the foregoing aspects or any possible implementation of any one of the foregoing aspects.

According to an eleventh aspect, a computer-readable storage medium is provided. The computer-readable storage medium stores a program. The program enables a terminal to perform the method of the terminal in any one of the foregoing aspects or any possible implementation of any one of the foregoing aspects.

According to a twelfth aspect, a computer-readable storage medium is provided. The computer-readable storage medium stores a program. The program enables a user plane network element to perform the method of the user plane network element in any one of the foregoing aspects or any possible implementation of any one of the foregoing aspects.

According to a thirteenth aspect, a communications chip is provided. The communications chip stores an instruction. When the instruction is run on a computer device, the communications chip is enabled to perform the method in any one of the foregoing aspects or any possible implementation of any one of the foregoing aspects.

According to a fourteenth aspect, this application further provides a computer program product including an instruction, where when the computer program product is run on a computer, the computer is enabled to perform the method in any one of the foregoing aspects or any possible implementation of any one of the foregoing aspects.

DESCRIPTION OF EMBODIMENTS

The following describes technical solutions of this application with reference to the accompanying drawings.

The technical solutions of the embodiments of this application may be applied to various communications systems, such as: a global system for mobile communication (GSM) system, a code division multiple access (CDMA) system, a wideband code division multiple access (WCDMA) system, a general packet radio service (GPRS), a long term evolution (LTE) system, an LTE frequency division duplex (FDD) system, an LTE time division duplex (TDD), a universal mobile telecommunications system (UMTS), a worldwide interoperability for microwave access (WiMAX) communications system, a future 5th generation (5G) system, or a new radio system.

Figure 1:
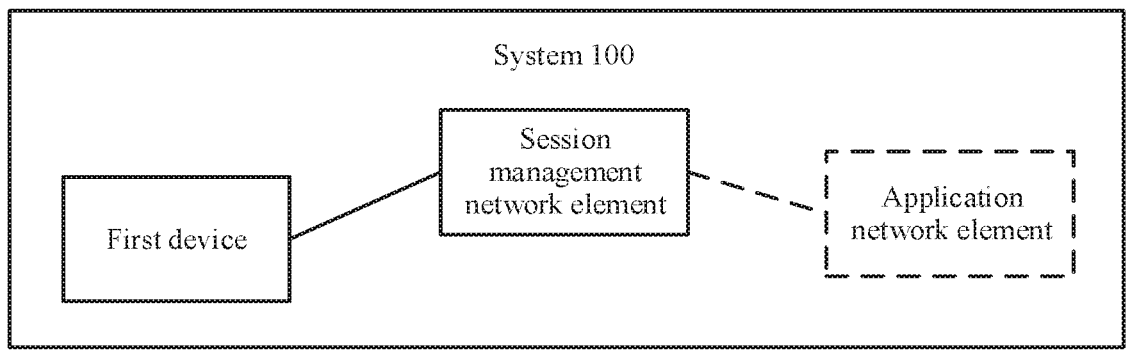
FIG. 1 is a schematic architectural diagram of a system to which an embodiment of this application is applied.

FIG. 1 is a schematic architectural diagram of a system to which an embodiment of this application is applied. As shown in FIG. 1, the system 100 includes a session management network element and a first device. Optionally, the first device includes a terminal and/or a user plane network element.

The system 100 may be configured to perform a link quality obtaining method in the embodiments of this application.

In a possible implementation, the session management network element is configured to determine a monitoring link, where the monitoring link is used to detect quality of service of a service transmitted between the session management network element and the terminal. The session management network element is further configured to send a first link quality reporting request to the first device, where the first link quality reporting request is used to indicate the first device to report quality of service information of the service path when a reporting policy is met. The first device is configured to send a first link quality notification message to the session management network element, where the first link quality notification message includes the quality of service information and an identifier of the monitoring link, so that the first device reports the quality of service information of the service path when the reporting policy is met, thereby helping a network side obtain network performance.

Optionally, the system 100 further includes an application network element.

In a possible implementation, the application network element is configured to send a second link quality reporting request to the session management network element, where the second link quality reporting request includes an identifier of a service corresponding to the service path.

Optionally, the session management network element is further configured to send a second link quality notification message to the application network element, where the second link quality notification message includes the quality of service information. In this way, the application network element can also learn of transmission performance of the link in a timely manner, to make corresponding adjustment in a timely manner when a fault occurs.

Optionally, when the first link quality reporting request includes one or more of a link quality reporting period, a latency threshold, a packet loss rate threshold, and a jitter threshold, the session management network element is further configured to: determine that the reporting policy needs to be updated; and send a first update message to the first device, where the first update message is used to indicate to update the reporting policy, and the first update message includes one or more of a link quality reporting period update value, a latency threshold update value, a packet loss rate threshold update value, and a jitter threshold update value. Therefore, the session management network element may update the reporting policy in a timely manner, to meet a quality of service requirement of the service.

Optionally, the application network element is further configured to send a second update message to the session management network element, where the second update message carries the identifier of the service, and the second update message includes one or more of a link quality reporting period update value, a latency threshold update value, a packet loss rate threshold update value, and a jitter threshold update value. Therefore, the session management network element may determine, based on an indication of the application network element, to update the reporting policy. An update manner is relatively flexible.

It should be noted that the session management network element, the first device, the application network element, and the like in FIG. 1 are merely names, and the names constitute no limitation on the devices. In a 5G network and another future network, network elements or entities corresponding to the session management network element, the first device, and the application network element may have other names. This is not specifically limited in this embodiment of this application. For example, the session management network element may alternatively be replaced by an SMF function entity, the user plane network element may alternatively be replaced by a UPF function entity, the application network element may alternatively be replaced by an application function AF entity, and so on. This is uniformly described herein, and details are not described below.

Optionally, the session management network element, the user plane network element, and the application network element in the system 100 may be separately a separate network element, or may be jointly implemented by a plurality of network elements, or may be used as a function module in a network element. This is not specifically limited in this embodiment of this application.

It may be understood that the foregoing function may be a network element in a hardware device, or may be a software function running on dedicated hardware, or may be a virtualization function instantiated on a platform (for example, a cloud platform).

The terminal in the embodiments of this application may also be referred to as user equipment (UE), an access terminal, a terminal in V2X communications, a subscriber unit, a subscriber station, a mobile station, a mobile console, a remote station, a remote terminal, a mobile device, a user terminal, a terminal, a wireless communication device, a user agent, a user apparatus, or the like. The terminal may be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal device in a future 5G network, or a terminal device in a future evolved public land mobile network (PLMN). This is not limited in the embodiments of this application. The terminal may further include a V2X device, for example, a vehicle or an on-board unit (OBU) in a vehicle.

The terminal in the embodiments of this application is connected to a radio access network (RAN) device in a wireless manner, and the radio access network device is connected to a core network device in a wireless or wired manner (not shown in FIG. 1). The core network device and the radio access network device may be different independent physical devices, or functions of the core network device and logical functions of the radio access network device may be integrated into a same physical device, or some functions of the core network device and some functions of the radio access network device may be integrated into one physical device. The terminal may be at a fixed location, or may be movable.

The radio access network device is an access device used by the terminal to access the mobile communications system in a wireless manner, and may be a NodeB, an evolved NodeB eNodeB, a gNodeB (gNB) in a 5G mobile communications system, a base station in a future mobile communications system, an access node in a wireless fidelity (WiFi) system, or the like, or may be a radio controller in a cloud radio access network (CRAN) scenario. Alternatively, the access network device may be a relay station, an access point, an in-vehicle device, a wearable device, a network device in a future 5G network, a network device in a future evolved PLMN network, or the like. A specific technology and a specific device form that are used by the radio access network device are not limited in this embodiment of this application.

The core network device may include, for example, a mobility management entity (MME), a broadcast/multicast service center (BMSC), or may include a corresponding function entity in a 5G system, for example, a core network control plane (CP) or a user plane (UP) network function, for example, a session management network function (SMF), an access and mobility management function (AMF), or the like. The core network control plane may also be understood as a core network control plane function (CPF) entity.

V2X communication means that a vehicle may obtain road condition information or receives information in a timely manner through vehicle to vehicle communication (V2V), vehicle to infrastructure communication (V2I), vehicle to pedestrian communication (V2P), or vehicle to network communication (V2N), or in another manner. The most common V2V and V2I are used as an example. A vehicle may broadcast information, such as a vehicle speed, a driving direction, a specific location, or whether an emergency brake is stepped on, of the vehicle to a nearby vehicle through V2V communication. The nearby vehicle obtains such information, so that a driver can better sense a traffic status, to make an early judgment on a dangerous status, and further make timely avoidance. Optionally, for V2I communication, in addition to interaction of the foregoing security information, the roadside infrastructure may further provide various types of service information, data network access, and the like for the vehicle. Functions such as no-stop charging and in-vehicle entertainment greatly improve traffic intelligence. Generally, a network used for V2X communication is referred to as an Internet of Vehicles.

The radio access network device and the terminal may be deployed on land, including indoors or outdoors, or in a handheld or vehicle-mounted manner; or may be deployed on the water; or may be deployed on an airplane, a balloon, and a satellite in the air. Application scenarios of the radio access network device and the terminal are not limited in the embodiments of this application.

The embodiments of this application are applicable to downlink signal transmission, or uplink signal transmission, or device-to-device (D2D) signal transmission. For downlink signal transmission, a sending device is a radio access network device, and a corresponding receiving device is a terminal. For uplink signal transmission, a sending device is a terminal, and a corresponding receiving device is a radio access network device. For D2D signal transmission, a sending device is a terminal, and a corresponding receiving device is also a terminal. A signal transmission direction is not limited in the embodiments of this application.

Communication may be performed between a radio access network device and a terminal and between terminals by using a licensed spectrum, or by using an unlicensed spectrum, or by using both a licensed spectrum and an unlicensed spectrum. Communication may be performed between the radio access network device and the terminal and between the terminals by using a spectrum below 6 GHz, using a spectrum above 6 GHz, or by using both a spectrum below 6 GHz and a spectrum above 6 GHz. A spectrum resource used between the radio access network device and the terminal is not limited in the embodiments of this application.

Optionally, the system 100 shown in FIG. 1 may be applied to a 5G network and another possible future network. This is not specifically limited in this embodiment of this application.

The system 100 shown in FIG. 1 is applied to a 5G network. In this case, as shown in FIG. 2, for example, the session management network element may be an SMF 202 in 5G, the user plane network element may be a UPF 208 in 5G, the terminal may be UE in 5G, and the application network element may be an AF 210 in 5G.

Figure 2:
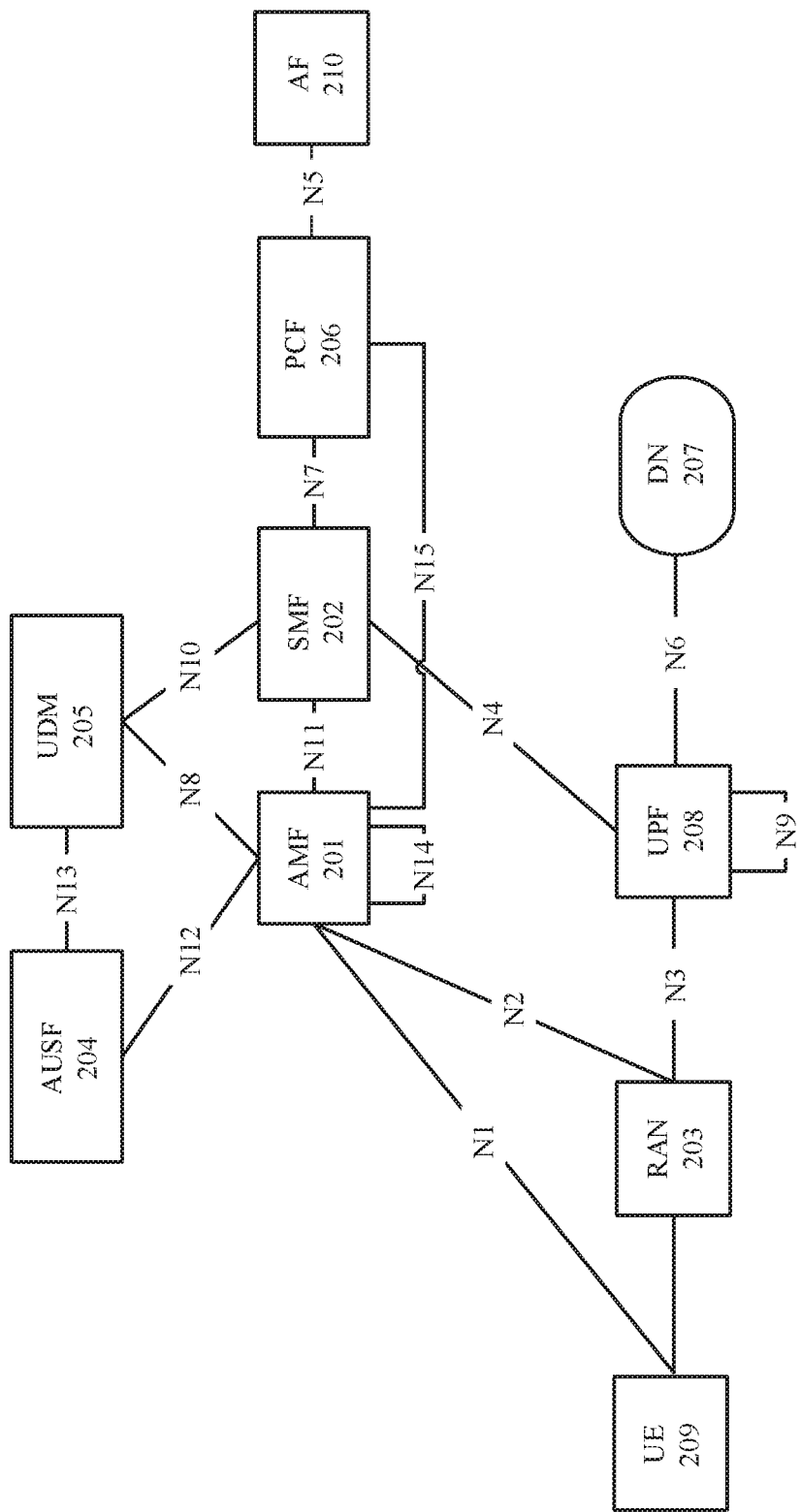
FIG. 2 is a diagram of a scenario to which an embodiment of this application is applied.

FIG. 2 is a diagram of a scenario to which an embodiment of this application is applied. As shown in FIG. 2, the system 200 includes an AMF 201, a session management function device (SMF) 202, a radio access network (RAN) 203, an authentication server function (AUSF) 204, a unified data management device (UDM) 205, a policy control function device (PCF) 206, a data network (DN) 207, a user plane function device (UPF) 208, user equipment (UE) 209, and an application function (AF) 210. The UE 209 is connected to the AMF 201 by using an N1 interface, and the UE 209 is connected to the RAN 203 by using a radio resource control (RRC) protocol. The RAN 203 is connected to the AMF 201 by using an N2 interface, and the RAN 203 is connected to the UPF 208 by using an N3 interface. A plurality of UPFs 208 are connected to each other by using an N9 interface, the UPF 208 is connected to the DN 207 by using an N6 interface, and the UPF 208 is connected to the SMF 202 by using an N4 interface. The SMF 202 is connected to the PCF 206 by using an N7 interface, the SMF 202 is connected to the UDM 205 by using an N10 interface, and the SMF 202 is connected to the AMF 201 by using an N11 interface. A plurality of AMFs 201 are connected to each other by using an N14 interface, the AMF 201 is connected to the UDM 205 by using an N8 interface, the AMF 201 is connected to the AUSF 204 by using an N12 interface, and the AMF 201 is connected to the PCF 206 by using an N15 interface. The AUSF 204 is connected to the UDM 205 by using an N13 interface. The AMF 201 and the SMF 202 obtain user subscription data from the UDM 205 by using the N8 interface and the N10 interface respectively, and obtain policy data from the PCF 206 by using the N15 interface and the N7 interface respectively. The AF 210 is connected to the PCF 206 by using an N5 interface. The SMF 202 controls the UPF 208 by using the N4 interface.

It should be noted that the naming of each network element (such as the SMF 202, the AF 210, or the UPF 208) included in FIG. 2 is only a name, and the name does not constitute any limitation on a function of the network element. In a 5G network and another future network, the foregoing network elements may alternatively have other names. This is not specifically limited in the embodiments of this application. For example, in a 6G network, some or all of the foregoing network elements may still use terms in 5G, or may use other names, or the like. This is uniformly described herein. Details are not described in the following.

For specific working processes and beneficial effects of the network elements in the systems in FIG. 1 and FIG. 2, refer to descriptions in the following method embodiments.

Figure 3:
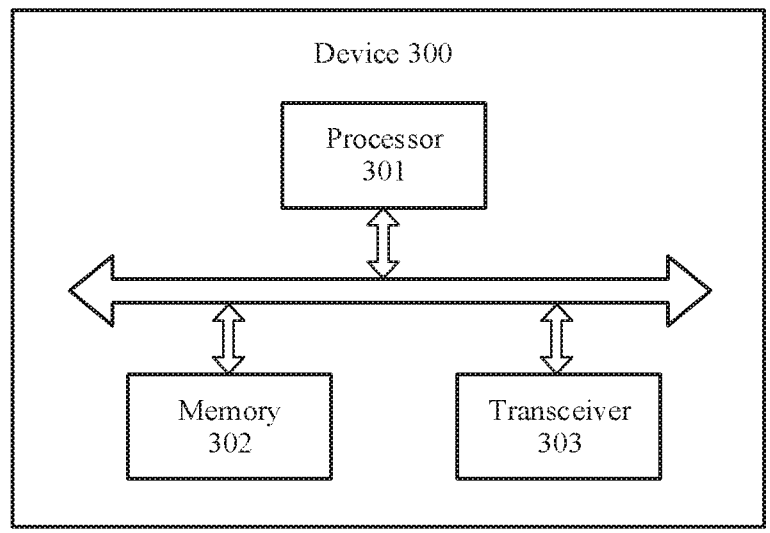
FIG. 3 is a schematic block diagram of a computer device to which an embodiment of this application is applied.

FIG. 3 is a schematic block diagram of a computer device 300 (or a link quality obtaining apparatus) to which an embodiment of this application is applied. The session management network element, the first device (including the terminal and/or the user plane network element), or the application network element in FIG. 1 may be implemented by the computer device in FIG. 3. Alternatively, the SMF 202, the UPF 208, the AF 210, or the UE 209 in FIG. 2 may be implemented by the computer device in FIG. 3.

As shown in FIG. 3, the computer device includes a processor 301, a memory 302, and a transceiver 303.

The processor 301, the memory 302, and the transceiver 303 communicate with each other through an internal connection path, and transfer control and/or data signals.

It may be understood that, although not shown, the computer device 300 may further include another apparatus, such as an input apparatus, an output apparatus, or a battery.

Optionally, in some embodiments, the memory 302 may store an executable instruction for performing the method in the embodiments of this application. The processor 301 may execute the instruction stored in the memory 302 in combination with other hardware (such as the transceiver 303) to complete the steps performed in the method shown below. For a specific working process and beneficial effects, refer to descriptions in the following method embodiments.

The method disclosed in the embodiments of this application may be applied to a processor, or implemented by a processor. The processor may be an integrated circuit chip and has a signal processing capability. In an implementation process, the steps in the foregoing method may be implemented by using a hardware integrated logical circuit in the processor, or by using instructions in a form of software. The processor may be a general-purpose processor, a digital signal processor (DSP), an application-specific integrated circuit (ASIC), a field programmable gate array (FPGA) or another programmable logical device, a discrete gate or transistor logic device, or a discrete hardware component. It may implement or perform the methods, the steps, and logical block diagrams that are disclosed in the embodiments of this application. The general-purpose processor may be a microprocessor, or the processor may be any conventional processor or the like. Steps of the methods disclosed with reference to the embodiments of this application may be directly executed and accomplished by means of a hardware decoding processor, or may be executed and accomplished by using a combination of hardware and software modules in the decoding processor. A software module may be located in a mature storage medium in the art, such as a random access memory (RAM), a flash memory, a read-only memory (ROM), a programmable read-only memory, an electrically erasable programmable memory, a register, or the like. The storage medium is located in the memory, and a processor reads instructions in the memory and completes the steps in the foregoing method in combination with hardware of the processor.

The computer device 300 may be a general-purpose computer device or a dedicated computer device. In a specific implementation, the computer device 300 may be a desktop computer, a portable computer, a network server, a palmtop computer (PDA), a mobile phone, a tablet computer, a wireless terminal device, a communications device, an embedded device, or a device having a structure similar to that in FIG. 3. A type of the computer device 300 is not limited in this embodiment of this application.

Figure 4:
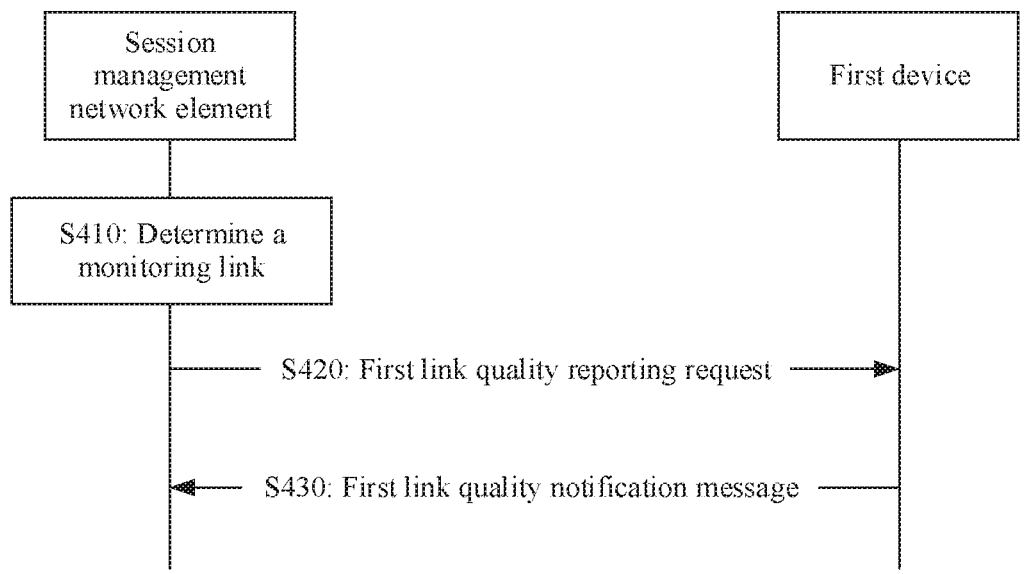
FIG. 4 is a schematic flowchart of a link quality obtaining method according to an embodiment of this application.

FIG. 4 is a schematic flowchart of a link quality obtaining method 400 according to an embodiment of this application. As shown in FIG. 4, the method 400 includes the following steps.

S410. A session management network element determines a monitoring link, where the monitoring link is used to detect quality of service of a service path between a first communications device and a second communications device.

Optionally, the monitoring link may be replaced by: a QoS monitoring link, a QoS detection link, a QoS monitoring connection, a QoS detection connection, a QoS detection session, a QoS monitoring session, an LQAP connection, an LQAP session, a network control protocol (NCP) link, an NCP monitoring link, an NCP connection, an NCP session, and other similar expressions that can detect the quality of service. This is not limited in this embodiment of this application.

Optionally, the service path may be equivalently replaced by a QoS flow, a packet data unit (PDU) session, or a service flow; or another similar expression that can be derived, such as an (end-to-end) transmission path or a transmission resource corresponding to or used for the QoS flow, the PDU session, or the service flow. This is not limited in this embodiment of this application.

Optionally, the quality of service of the service path may be equivalently replaced by: quality of the service path, transmission quality or quality of service of a service corresponding to the service path, transmission quality of the service path, quality of service performance of a service transmitted on the service path, transmission quality of a service transmitted on the service path (for example, quality of service performance of a data packet transmitted on a service path on which a detection packet is actually transmitted), and other similar expressions that can be derived. This is not limited in this embodiment of this application.

Optionally, "detect" in the sentence that the monitoring link is used to detect quality of service of a service path between a first communications device and a second communications device may be replaced by another similar expression that has a function of obtaining quality of service of a link, such as survey, monitor, supervise, measure, calculate, or decide. This is not limited in this embodiment of this application.

Optionally, the session management network element may be the SMF 202 in FIG. 2, or a device or a function entity that has a session management function. This is not limited.

Optionally, the first communications device and the second communications device are uplink and downlink devices for each other. For example, the first communications device may be understood as a terminal. The second communications device may be understood as a user plane network element (for example, a UPF). Alternatively, the first communications device may be understood as a user plane network element. The first communications device may be understood as a terminal.

Optionally, a function of the monitoring link is to detect the quality of service of the service path between the first communications device and the second communications device. It should be noted that the monitoring link may be understood as a logical detection link established between the first communications device and the second communications device on a transmission link of a service or a service flow (for example, a URLLC service), and the logical detection link and the service use a same end-to-end transmission and processing resource, including a processing resource in a base station, a processing resource in the UPF, a transmission path between UE and the base station, and a transmission path between the base station and the UPF. Optionally, a network side control plane may indicate the first communications device and the second communications device to establish the logical detection link, or the first communications device and the second communications device may spontaneously establish the logical detection link. This is not limited.

It should be noted that the monitoring link may be specially used to detect the quality of service. Alternatively, the monitoring link may be understood as a general transmission path, and may further perform another function in addition to QoS detection. For example, for a path corresponding to a network control protocol NCP, in addition to QoS monitoring, the NCP protocol may be further used for a function such as bicasting. This is not limited in this embodiment of this application.

Alternatively, the monitoring link may be a service transmission path, and in this case, an identifier of the monitoring link is a service identifier. Therefore, the detection packet and a service packet may use a same end-to-end transmission and processing resource.

Optionally, the first communications device and the second communications device may detect the quality of service information by sending detection packets to each other. Specifically, on the monitoring link, the first communications device and the second communications device send detection packets to each other, and the quality of service of the monitoring link and transmission quality of a pipe in which the monitoring link is located can be determined based on an arrival status of the detection packet. The pipe corresponds to the end-to-end transmission and processing resource described above. In other words, the quality of service of the monitoring link that is determined by using the detection packet may reflect quality of service of the service.

A 5G network introduces a link quality awareness protocol (LQAP) for the URLLC service. Optionally, the monitoring link may be an LQAP logical monitoring link established between the first communications device and the second communications device, and the monitoring link is identified by using an LQAP identifier (ID).

For ease of understanding, the following uses an uplink case as an example to describe a process of sending a detection packet. For example, the first communications device is a terminal, and the second communications device is a UPF. After establishing an LQAP connection to the UPF, the terminal can obtain a context of the LQAP connection. The context includes an LQAP ID, a sending rule (for example, periodic sending) of a detection data packet, a construction manner of the detection data packet, and the like. Correspondingly, the UPF can obtain the LQAP ID and an expected acceptance rule for the detection data packet. Then, the terminal sends an LQAP detection packet to the UPF based on the context of the LQAP connection, where the LQAP detection packet carries the LQAP ID. After receiving the LQAP detection packet, the UPF locates the context of the LQAP connection based on the LQAP ID, and obtains the expected acceptance rule from the context. Then, the UPF can determine quality of service of the LQAP connection by comparing an actual arrival status of the LQAP detection packet with the expected acceptance rule.

S420. The session management network element sends a first link quality reporting request to a first device, where the first link quality reporting request is used to indicate the first device to report quality of service information of the service path when a reporting policy is met, and the first device includes the first communications device and/or the second communications device. Correspondingly, the first device receives the first link quality reporting request.

Optionally, the quality of service information includes the quality of service parameter and/or a link status notification message, and the link status notification message is used to indicate that the quality of service parameter of the service path meets the reporting policy. The link status notification message may specifically indicate that the quality of service parameter detected by the first device meets a corresponding threshold. In other words, the first device may not only report a specific quality of service parameter to the session management network element, but also report, to the session management network element, information indicating that a detected quality of service parameter meets a corresponding threshold. This is not limited.

In this embodiment of this application, a link quality reporting request (for example, the first link quality reporting request) may be replaced by another description having a similar function, such as a link quality event reporting message, a link quality subscription message, a link quality subscription notification, a link quality notification request, or a link quality event subscription. This is not limited in this embodiment of this application.

It should be noted that the quality of service parameter refers to some parameters reflecting quality of service (QoS) of the service path, and is used to represent real-time transmission performance of the quality of service of the service path. For example, the quality of service parameter includes one or more of a packet loss rate, a jitter parameter, a latency parameter, a jitter level, and a bandwidth requirement.

Optionally, the quality of service of the service path may refer to transmission performance of the detection packet. Optionally, the quality of service information is obtained by the first communications device or the second communications device by sending a detection packet. For example, the first communications device and the second communications device send detection packets to each other. Herein, for a process of sending the detection packet, refer to the foregoing specific description. It should be noted that a bottom-layer transmission resource or a transmission pipe used for the detection packet is the same as a transmission resource or a transmission pipe used for the service packet. Therefore, the quality of service of the service path may reflect the quality of service of the service.

Optionally, the reporting policy may be sent by an application network element to the session management network element. This is not limited.

Specifically, the first link quality reporting request includes a link quality reporting period. The reporting policy indicates that the first device reports the quality of service information based on the link quality reporting period.

In other words, the session management network element may deliver the link quality reporting period (for example, T is used to represent the link quality reporting period) to the first device, so that the first device performs reporting based on the link quality reporting period. In this way, compared with the solution in the prior art, the session management network element in this embodiment of this application can obtain network performance in real time.

It should be understood that, that periodic reporting is a most possible implementation is used as an example for description herein, but other possibilities are not excluded. For example, a reporting time interval gradually increases or decreases, or has a specific gradient rule. This is not limited in this embodiment of this application. For example, the reporting time interval is 1 ms, 2 ms, 3 ms, 4 ms, or the like.

It should be noted that, in a case in which the first device reports the quality of service information based on two factors (including the link quality reporting period and the threshold corresponding to the quality of service parameter), when the first device reports the quality of service information based on the link quality reporting period, alternatively, a notification message indicating whether the quality of service parameter of the service path meets the threshold corresponding to the quality of service parameter may be reported to the session management network element. Specifically, when the link quality reporting period arrives, if the first device detects that the quality of service parameter of the service path in this case meets the threshold corresponding to the quality of service parameter, the quality of service information includes a link status notification message, and the link status notification message is used to indicate that the quality of service parameter of the service path meets the threshold corresponding to the quality of service parameter; or if the first device detects that the quality of service parameter of the service path in this case does not meet the threshold corresponding to the quality of service parameter, the quality of service information includes a link status notification message, and the link status notification message is used to indicate that the quality of service parameter of the service path does not meet the threshold corresponding to the quality of service parameter, so that the session management network element learns of the quality of service information of the service path in real time.

Specifically, when the quality of service information is the quality of service parameter of the service path, that the first device meets the reporting policy indicates that the first device detects that the quality of service parameter meets one or more of the following conditions:

a latency parameter of the service path is greater than or equal to a latency threshold, where the quality of service parameter includes the latency parameter;

a packet loss rate of the service path is greater than or equal to a packet loss rate threshold, where the quality of service parameter includes the packet loss rate; and a jitter parameter of the service path is greater than or equal to a jitter threshold, where the quality of service parameter includes the jitter parameter.

In other words, the session management network element may deliver the threshold of the quality of service parameter to the first device, so that the first device performs reporting based on the threshold of the quality of service parameter. This helps the session management network element learn of the quality of service parameter (one or more of the jitter parameter, the packet loss rate, and the latency parameter) of the service path.

It should be understood that the foregoing two reporting manners (including period-based reporting and threshold-based reporting) may coexist, or only one of the two reporting manners may exist. This is not limited in this embodiment of this application.

In this embodiment of this application, the first device may determine the threshold of the quality of service parameter based on actual requirements of different services. Alternatively, the session management network element may deliver the threshold of the quality of service parameter to the first device.

For example, in this embodiment of this application, the latency threshold, the packet loss rate threshold, or the jitter threshold may be determined by the first device based on a service requirement, or may be delivered by the session management network element to the first device. Optionally, the first link quality reporting request includes one or more of the latency threshold, the packet loss rate threshold, and the jitter threshold.

The following describes a possible specific case in which the first device reports the quality of service information.

(1) If the quality of service information is the quality of service parameter, when the link quality reporting period arrives, the first device reports the quality of service parameter based on the link quality reporting period. (2) If the quality of service information includes the quality of service parameter and the link status notification message, when a period of the link quality reporting period arrives, the first device reports the quality of service parameter based on the threshold corresponding to the quality of service parameter, and may further report the link status notification message. The link status notification message is used to indicate whether the quality of service parameter exceeds the threshold corresponding to the quality of service parameter. (3) If the quality of service information includes the quality of service parameter and the link status notification message, and the threshold of the quality of service parameter is delivered by the session management network element to the first device, correspondingly, the first device reports the link status notification message to the session management network element when the link quality reporting period arrives. The link status notification message is used to indicate whether the quality of service parameter meets the threshold of the quality of service parameter. (4) If the quality of service information includes the quality of service parameter and the link status notification message, and the threshold of the quality of service parameter is delivered by the session management network element to the first device, correspondingly, when detecting that the quality of service parameter exceeds the threshold of the quality of service parameter, the first device reports the link status notification message to the session management network element. The link status notification information is used to indicate that the quality of service parameter exceeds the threshold of the quality of service parameter. (5) If the quality of service information is the link status notification message, and the threshold of the quality of service parameter is determined by the first device based on a service requirement, when the quality of service parameter exceeds the threshold of the quality of service parameter, the first device sends the link status notification message to the session management network element. The link status notification message is used to indicate that the quality of service parameter exceeds the threshold of the quality of service parameter. (6) If the quality of service information includes the quality of service parameter and the link status notification message, and the threshold of the quality of service parameter is determined by the first device based on a service requirement, when the quality of service parameter exceeds the threshold of the quality of service parameter, the first device reports the quality of service parameter and the link status notification message to the session management network element. The link status notification message is used to indicate that the quality of service parameter exceeds the threshold of the quality of service parameter. (7) If the quality of service information includes the quality of service parameter and the link status notification message, after detecting the quality of service parameter, the first device may directly determine whether the quality of service parameter meets a service requirement, and then report an indication indicating whether the quality of service parameter meets the service requirement and the quality of service parameter to the session management network element.

It should be understood that the quality of service parameter may be one or more of a latency parameter, the packet loss rate, and the jitter parameter. Correspondingly, the threshold of the quality of service parameter is one or more of the latency threshold, the packet loss rate threshold, and the jitter threshold.

It should be further understood that the foregoing lists only seven possible cases, and does not constitute a limitation on this embodiment of this application. A person skilled in the art may change or deduce a plurality of related implementations based on the foregoing cases. The plurality of implementations also fall within the protection scope of this embodiment of this application.

Optionally, the latency threshold may include an uplink latency threshold and/or a downlink latency threshold. The uplink latency threshold is delivered to the user plane network element, and the downlink latency threshold is delivered to the terminal. In this way, if the user plane network element receives the uplink latency threshold, the user plane network element may perform reporting based on the uplink latency threshold and the uplink threshold. If the terminal receives the downlink latency threshold, the terminal may perform reporting with reference to the detection packet and the downlink latency threshold. Optionally, the uplink latency threshold and the downlink latency threshold may be the same or different. If the uplink latency threshold is the same as the downlink latency threshold, it may be understood that there is only one latency threshold.

Optionally, the packet loss rate threshold may include an uplink packet loss rate threshold and/or a downlink packet loss rate threshold. The uplink packet loss rate threshold is delivered to the user plane network element, and the downlink packet loss rate threshold is delivered to the terminal. In this way, if the user plane network element receives the uplink packet loss rate threshold, the user plane network element may perform reporting based on the uplink packet loss rate threshold and the uplink packet loss rate threshold. If the terminal receives the downlink packet loss rate threshold, the terminal may perform reporting with reference to the detection packet and the downlink packet loss rate threshold. Optionally, the uplink packet loss rate threshold and the downlink packet loss rate threshold may be the same or different. If the uplink packet loss rate threshold is the same as the downlink packet loss rate threshold, it may be understood that there is only one packet loss rate threshold.

Optionally, the jitter parameter threshold may include an uplink jitter parameter threshold and/or a downlink jitter parameter threshold. The uplink jitter parameter threshold is delivered to the user plane network element, and the downlink jitter parameter threshold is delivered to the terminal. In this way, if the user plane network element receives the uplink jitter parameter threshold, the user plane network element may perform reporting based on the uplink jitter parameter threshold and the uplink jitter parameter threshold. If the terminal receives the downlink jitter parameter threshold, the terminal may perform reporting with reference to the detection packet and the downlink jitter parameter threshold. Optionally, the uplink jitter parameter threshold and the downlink jitter parameter threshold may be the same or different. If the uplink jitter parameter threshold is the same as the downlink jitter parameter threshold, it may be understood that there is only one jitter parameter threshold.

S430. When the reporting policy is met, the first device sends a first link quality notification message to the session management network element, where the first link quality notification message includes the quality of service information and an identifier of the monitoring link. Correspondingly, the session management network element receives the first link quality notification message from the first device.

Optionally, the identifier of the monitoring link may be an LQAP ID, but a possibility that the identifier of the monitoring link is a service identifier is not excluded.

Optionally, a link quality notification message (for example, the first link quality notification message) may be replaced by another description having a similar function, such as a link quality response message, a link quality subscription response notification, a link quality notification response, or a link quality event subscription response.

In this embodiment of this application, the session management network element determines the monitoring link, where the monitoring link is used to detect the quality of service of the service path between the first communications device and the second communications device, and sends the first link quality reporting request to the first device, so that the first device reports the quality of service information of the service path when the reporting policy is met, thereby helping the network side obtain network performance.

Optionally, in a first possible implementation, S410 includes: determining, by the session management network element based on a quality of service requirement of a service, an identifier of the service corresponding to the service path; and determining, by the session management network element, the monitoring link based on the identifier of the service.

In this embodiment of this application, the service corresponding to the service path may be understood as a service transmitted on the service path. In other words, the service is transmitted by using the service path. It should be understood that the service may not be all services transmitted on the service path, and may be one of the services. This is not limited in this embodiment of this application.

In other words, the session management network element may learn of the identifier of the service based on the quality of service requirement of the current service, and then search, based on the identifier of the service, for context information corresponding to the service. The session management network element determines the identifier (for example, the LQAP ID) of the monitoring link based on the context information, and determines the monitoring link based on the identifier of the monitoring link.

Optionally, in a second possible implementation, S410 includes: receiving, by the session management network element, reporting indication information from a policy control network element, where the reporting indication information is used to indicate to report the quality of service information; determining, by the session management network element based on the reporting indication information, an identifier of a service corresponding to the service path; and determining, by the session management network element, the monitoring link based on the identifier of the service. Optionally, the reporting indication information carries the identifier of the service. Herein, the policy control network element may be the PCF 206 in FIG. 2.

In other words, the session management network element may learn of the identifier of the service based on an indication of the policy control network element, and then search, based on the identifier of the service, for context information corresponding to the service. The session management network element determines the identifier (for example, the LQAP ID) of the monitoring link based on the context information, and determines the monitoring link based on the identifier of the monitoring link.

Figure 5:
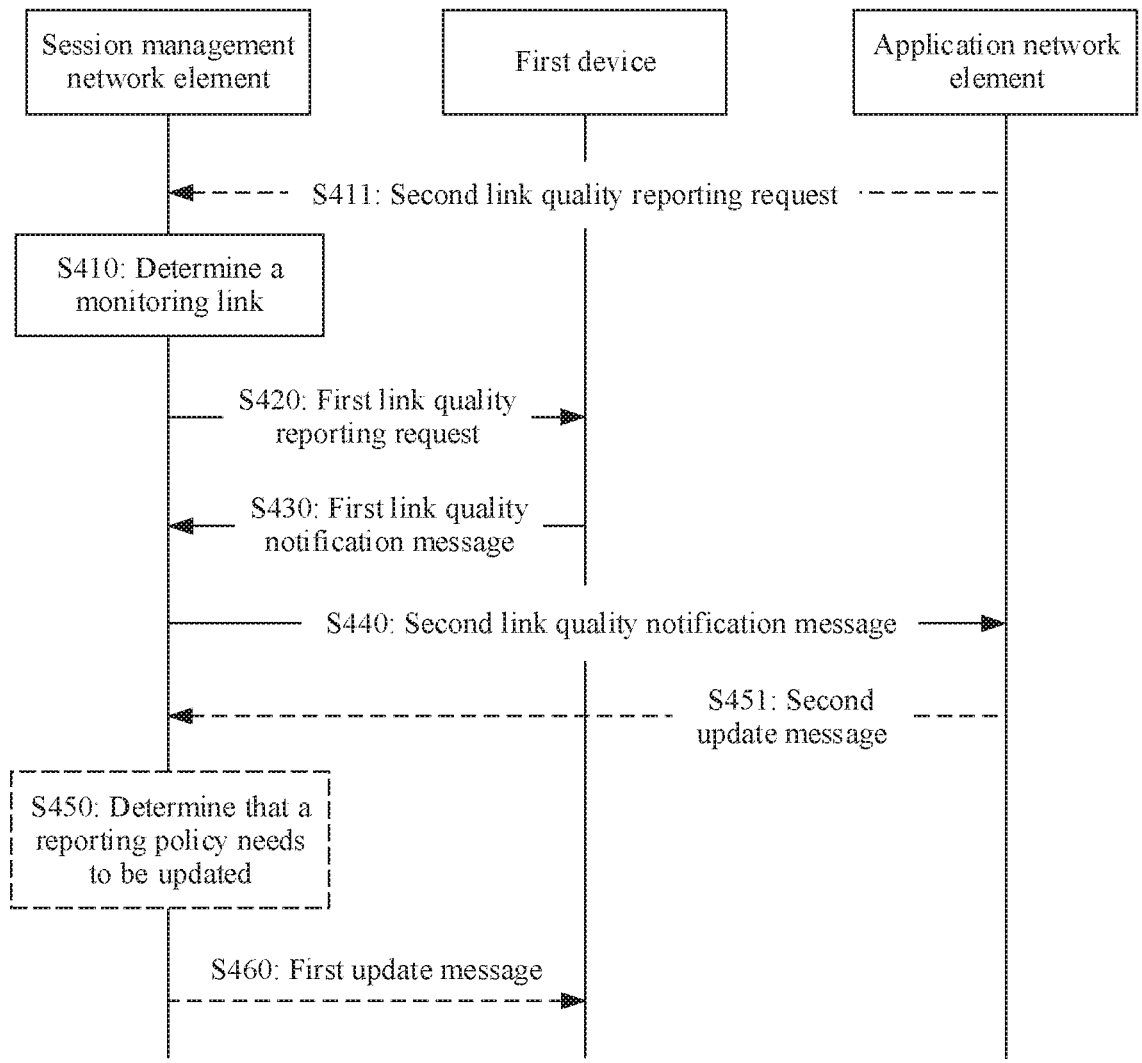
FIG. 5 is a schematic flowchart of a link quality obtaining method according to another embodiment of this application.

Optionally, in a third possible implementation, as shown in FIG. 5, the method 400 further includes:

S411. The session management network element receives a second link quality reporting request from an application network element, where the second link quality reporting request includes an identifier of a service corresponding to the service path. S410 includes: determining, by the session management network element, the monitoring link based on the identifier of the service.

Herein, the service is a service transmitted between the first communications device and the second communications device. The identifier of the service may include information such as authentication quintuple information and a QoS flow identifier.

Specifically, the session management network element obtains the identifier of the service based on the second link quality reporting request of the application network element, and determines the monitoring link based on the identifier of the service. In other words, the session management network element determines the monitoring link based on an indication of the application network element.

Figure 6:
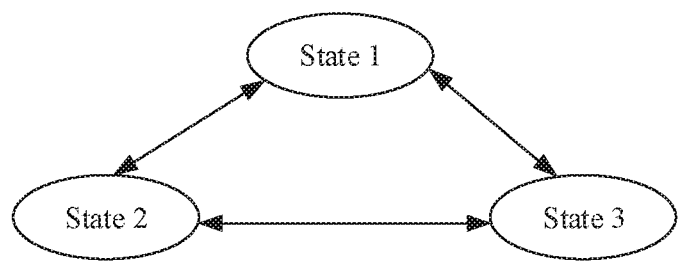
FIG. 6 is a schematic diagram of an application scenario according to an embodiment of this application.

Herein, the application network element may send the second link quality reporting request to the session management network element based on a service requirement and a status of the application network element. For example, a service corresponding to the foregoing application network element relates to a scenario such as remote robot control. FIG. 6 is a schematic diagram of an application scenario according to an embodiment of this application. As shown in FIG. 6, a remote robot control scenario may be classified into a state 1, a state 2, and a state 3. The state 1 may be understood as an initial startup state. Specifically, a robot intermittently interacts with a network in a startup process, to implement functions such as authentication and authorization, and has a relatively low requirement on a latency. The state 2 may be understood as a non-operation state of the robot or an operation state that has a relatively low requirement on transmission performance such as a latency. In this state, the robot interacts with the network periodically, so that a remote controller learns that the robot is in the non-operation state. The non-operation state has a low requirement on a latency. Periodic interaction is used to enable a server to learn that the robot is available. The state 3 may be understood as an operation state. The robot performs a corresponding operation (for example, a remote operation such as remote surgery) by receiving a remote instruction. In the operation state, a requirement on network transmission is extremely high. Once the remote controller needs to send an instruction to the robot, the corresponding instruction needs to be sent to the robot within a specified time period. Otherwise, there is a high probability of an accident. Therefore, once the application network element enters the state 3, it indicates that a requirement on link quality is extremely high in this case. Before the application network element enters the state 3 or when the application has entered the state 3, the application may subscribe to a link quality event from the network side, that is, specifically, send the second link quality reporting request to the session management network element, to expect to obtain a real-time quality of service parameter of the robot. Optionally, for another state (the state 1 or the state 2) that does not have a high requirement on link quality, whether a quality of service parameter needs to be subscribed to may be determined based on a requirement. This is not limited. It should be understood that the technical solutions in the embodiments of this application may be applied to a scenario in which link quality needs to be obtained in real time, for example, a scenario in which link quality or a link event needs to be learned of in real time, such as telemedicine, industrial control, robot control, intelligent control, or automatic communication or control. This is not limited.

In the foregoing three possible implementations, the session management network element determines, based on the identifier of the service, the context information corresponding to the service, and the session management network element determines the monitoring link based on the context information.

Specifically, the session management network element may locate, based on the identifier of the service, a local context corresponding to the service, and then obtain the identifier of the monitoring link, for example, the LQAP ID, from information about the local context. Optionally, if no monitoring link exists, the session management network element needs to establish a monitoring link. For example, if no LQAP ID exists in the local context, the session management network element allocates an LQAP ID to the first communications device and the second communications device, and initiates LQAP link establishment, so that an LQAP link is established between the first communications device and the second communications device. In this way, the first communications device and the second communications device may feed back the quality of service parameter based on the LQAP link.

Optionally, the second link quality reporting request may be sent to the user plane network element in a process of establishing the monitoring link, or may be sent after the monitoring link is established. This is not limited in this embodiment of this application.

Optionally, a specific representation form of the identifier of the service may be one or more of the following: an IP 5-tuple, a terminal address, an application address, an application identifier, a terminal identifier, a service flow identifier, a service aggregation flow identifier, a packet data unit (PDU) session ID, and a QoS flow ID.

Optionally, the session management network element may send, to the application network element, the quality of service information reported by the first device, so that the application network element learns of performance of the link. As shown in FIG. 5, the method 400 further includes the following steps.

S440. The session management network element sends a second link quality notification message to the application network element, where the second link quality notification message includes the quality of service information. Correspondingly, the application network element receives the second link quality notification message. That is, further, after receiving the quality of service information (including the first link quality notification message) reported by the first device, the session management network element may send, to the application network element, the quality of service information reported by the first device, so that the application network element perceives the link quality event in real time. In this way, the application network element can highly cooperate with the 5G network.

Optionally, after receiving the quality of service information, the application network element may also perform a corresponding adjustment measure. For example, if the application network element finds that a link is faulty or congested, one or more of the following adjustment measures may be performed: (1) adjusting a sending rate, for example, reducing the sending rate to reduce impact on bandwidth, to effectively avoid a fault, where for a specific operation, reference may be made to a congestion control technology in an existing transmission control protocol (TCP) technology; (2) adjusting a codec rate, for example, reducing the codec rate, to reduce a requirement of a service on bandwidth, and reducing impact on a network by sacrificing a part of quality of service, where for details, reference may be made to an adaptive video picture quality adjustment technology in a video call (for example, a WeChat video call); (3) adjusting a non-critical service, for example, disabling a non-critical service to reduce bandwidth usage. It should be understood that the foregoing three manners are merely examples of some adjustments that may be performed by the application network element, and do not constitute a limitation on this embodiment of this application.

In addition, when receiving the first link quality notification message, the session management network element may learn of a network status of the first device. For example, the network status may be any one of wireless handover (or air interface handover), user plane function UPF reselection, and packet data unit PDU session establishment or reestablishment. The session management network element determines, based on the network status, not to send the second link quality notification message to the application network element. Specifically, the session management network element determines, based on the network status, that a change of the quality of service parameter is a stable error or a normal case (for example, a wireless handover state causes a specific latency, but is restored to normal after a period of time), and determines not to report the second link quality notification message to the application network element. Certainly, if the session management network element determines, based on the network status, that the change of the quality of service parameter exceeds a normal range, the session management network element needs to report the second link quality notification message to the application network element. In this case, the session management network element may add network status indication information to the second link quality notification message, and feed back the current network status to the application network element, so that the application network element determines, based on the network status, whether the reporting policy needs to be adjusted (for example, adjust a period, or adjust a threshold).

In the foregoing description, when receiving the first link quality notification message from the first device, the session management network element can directly learn of the network status of the first device. In another possible case, the first device adds network status indication information to the first link quality notification message, where the network status indication information is used to indicate the network status of the first device, so that the session management network element learns of a status of the first device based on the network status indication information. This is not limited.

In this embodiment of this application, when the first link quality reporting request includes one or more of the link quality reporting period, the latency threshold, the packet loss rate threshold, and the jitter threshold, the session management network element may further determine whether the reporting policy needs to be updated or adjusted. As shown in FIG. 5, the method specifically includes the following steps.

S450. The session management network element determines that the reporting policy needs to be updated.

S460. The session management network element sends a first update message to the first device, where the first update message is used to indicate to update the reporting policy, and the first update message includes one or more of a link quality reporting period update value, a latency threshold update value, a packet loss rate threshold update value, and a jitter threshold update value. Correspondingly, the first device receives the first update message. The first update message carries the identifier of the monitoring link. That the first update message carries an identifier of a monitoring link is intended to help the first device search for a monitoring link whose reporting policy needs to be updated, or search for a local context that is of the monitoring link and that corresponds to the identifier of the monitoring link.

It should be understood that which update value is specifically included in the first update message may directly depend on specific content included in the first link quality reporting request. Certainly, this does not constitute a limitation on this embodiment of this application. An update value specifically included in the first update message may be specific to only some content included in the first link quality reporting request. For example, the first link quality reporting request includes the link quality reporting period, the latency threshold, the packet loss rate threshold, and the jitter threshold, but the first update message may include the link quality reporting period update value, the latency threshold update value, the packet loss rate threshold update value, and the jitter threshold update value, or may include only the latency threshold update value, the packet loss rate threshold update value, and the jitter threshold update value. Herein, which thresholds need to be updated may be determined based on an actual situation of the quality of service information reported by the first device or an actual requirement of the service. This is not limited in this embodiment of this application.

The "update" includes one or more of adding, modifying, and deleting. For example, a threshold corresponding to a quality of service parameter that needs to be reported is added: thresholds corresponding to a reporting policy before updating include a jitter threshold and a latency threshold; thresholds corresponding to an updated reporting policy include a jitter threshold, a latency threshold, a packet loss rate threshold, and a link quality reporting period. For another example, the reporting policy may be modified. For another example, a threshold corresponding to a quality of service parameter that needs to be reported is deleted; thresholds corresponding to a reporting policy before update include a jitter threshold, a latency threshold, a packet loss rate threshold, and a link quality reporting period; thresholds corresponding to an updated reporting policy includes a latency threshold and a link quality reporting period. It should be understood that the examples herein are merely for ease of understanding by a person skilled in the art, and do not constitute any limitation on the embodiments of this application. A person skilled in the art may obtain different solutions through transformation based on the foregoing examples, and all the transformed solutions fall within the protection scope of the embodiments of this application.

Specifically, when determining that the reporting policy needs to be updated, the session management network element sends the first update message to the first device. The first device modifies specific content corresponding to the reporting policy based on the first update message. This includes one or more of the following updates: updating the link quality reporting period based on the link quality reporting period update value; updating the latency parameter based on the latency threshold update value; updating the packet loss rate threshold based on the packet loss rate threshold update value; and updating the jitter threshold based on the jitter threshold update value. For example, if the link quality reporting period before the update is 2 milliseconds (ms), and the session management network element changes, based on a QoS requirement, reporting once every 2 ms to reporting once every 5 ms, the updated link quality reporting period is 5 ms. For another example, the session management network element may modify a specific threshold based on a change of a QoS requirement, including modifying one or more of the latency threshold, the packet loss rate threshold, and the jitter threshold. In this way, the first device may report the quality of service information of the service path based on the updated reporting policy. It should be understood that which content is specifically updated by the first device may depend on content carried in the first update message.

Further, as shown in FIG. 5, the method 400 further includes:

S451. The session management network element receives a second update message from the application network element, where the second update message carries the identifier of the service, and the second update message includes one or more of a link quality reporting period update value, a latency threshold update value, a packet loss rate threshold update value, and a jitter threshold update value.

The determining, by the session management network element, that the reporting policy needs to be updated includes: determining, by the session management network element, the monitoring link based on the identifier of the service; and determining, by the session management network element, the monitoring link based on the identifier of the service.

Specifically, the session management network element may determine, based on an indication of the application network element, to update the reporting policy. Herein, to locate the monitoring link whose reporting policy needs to be updated, the application network element needs to add the identifier of the service to the second update message. In this way, the session management network element can locate, based on the identifier of the service, a local context corresponding to the service, and then obtain the identifier of the monitoring link, for example, the LQAP ID, from information about the local context, to determine the monitoring link, and determine that the reporting policy of the monitoring link needs to be updated.

Optionally, the method 400 further includes: evaluating, by the session management network element, link quality of the monitoring link based on the first link quality notification message; and sending, by the session management network element, a repair indication to the first device based on an evaluation result, where the repair indication is used to indicate the first device to optimize or repair the service path, for example, indicate the first device to perform bicasting. In other words, a service path that needs to be optimized or repaired may be understood as a transmission link or a bearer corresponding to a service.

Specifically, the session management network element may evaluate the quality of service of the monitoring link based on the quality of service information reported by the first device and a corresponding quality of service requirement. For example, when the quality of service information is a link status notification message, if the link notification message indicates that the quality of service parameter meets a corresponding threshold, the session management network element performs link repair. If the link notification message indicates that the quality of service parameter does not meet the corresponding threshold, the session management network element may determine that the quality of service parameter of the service path is normal, and may determine, based on an actual situation of a service requirement, whether to perform link repair. For another example, when the quality of service information is a quality of service parameter, if the reported quality of service parameter exceeds a corresponding threshold, the session management network element performs link repair. If the reported quality of service parameter does not exceed the corresponding threshold, but approaches or is approximate to the corresponding threshold, the session management network element makes a comprehensive decision based on the network status. If it is determined that the quality of service parameter is normal, link repair is not performed. If the reported quality of service parameter does not exceed the corresponding threshold, but approaches or is approximate to the corresponding threshold, the network status is normal at this time, and no handover is performed, the session management network element considers that the quality of service parameter is abnormal and a link fault may be subsequently caused, and therefore, initiates link repair.

That the session management network element initiates link repair means that the session management network element sends a repair indication to the first device, where the repair indication is used to indicate the first device to optimize or repair the service path. For example, if the service already has a plurality of connections, but a standby connection is not enabled, the session management network element notifies the first device to enable the standby connection to perform bicasting. If the service is currently in a single-connection scenario, the session management network element establishes a new transmission path for the service, so that the first device transmits data of the service by using a current path and the new transmission path together, for example, in a dual-connection scenario. Alternatively, the session management network element performs another effective repair measure, provided that normal transmission of a service is not affected. This is not limited in this embodiment of this application.

Figure 7:
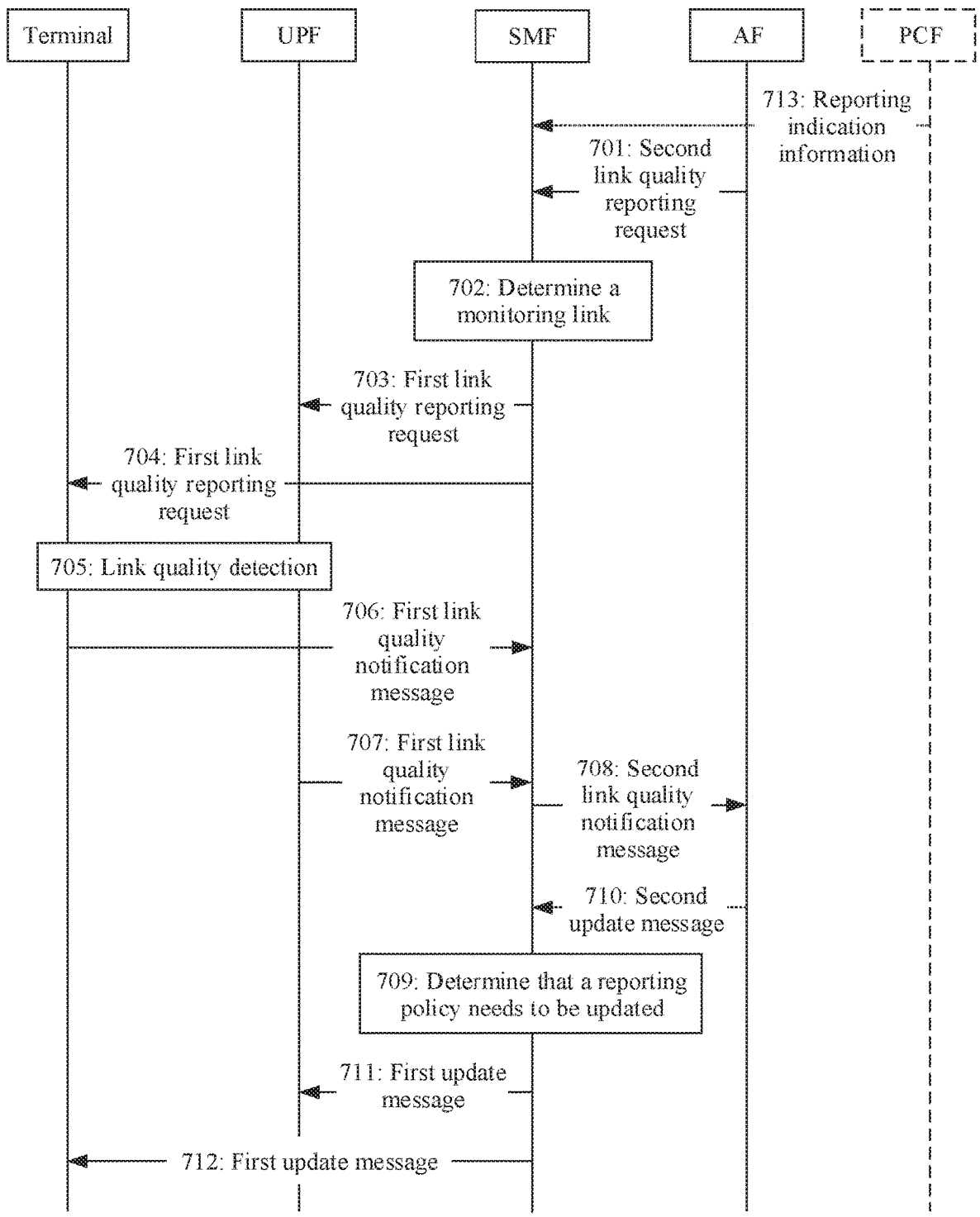
FIG. 7 is a schematic diagram of an example according to an embodiment of this application.

The following describes, with reference to a specific example, a case in which the quality of service information of the service path is the quality of service parameter of the service path. It should be understood that the example herein is only for a person skilled in the art to understand the technical solutions of the embodiments of this application, and do not constitute any limitation on the embodiments of this application. In the following example, an SMF is used as the session management network element, the first device includes a terminal and a UPF, an AF is used as the application network element, and a PCF is used as the policy control network element. This is uniformly described herein. As shown in FIG. 7, the method includes the following steps.

701. The AF sends a second link quality reporting request to the SMF. Correspondingly, the SMF receives the second link quality reporting request. The second link quality reporting request includes an identifier of a service corresponding to a service path. Optionally, the second link quality reporting request may include a reporting policy, including threshold-based reporting and/or period-based reporting. For description of the reporting policy, refer to the foregoing description.

702. The SMF determines a monitoring link.

The SMF may determine the monitoring link based on the identifier of the service in step 701, or may determine the monitoring link based on a quality of service requirement of the service. This is not limited. Herein, for a process of determining the monitoring link, refer to the description in the foregoing embodiment. Details are not described herein again.

703. The SMF sends a first link quality reporting request to the UPF. Correspondingly, the UPF receives the first link quality reporting request from the SMF. The first link quality reporting request is used to indicate the UPF to report a quality of service parameter of the service path when the reporting policy is met. Optionally, the first link quality reporting request includes a link quality reporting period. Optionally, the first link quality reporting request includes one or more of a link quality reporting period, an uplink latency threshold, an uplink packet loss rate threshold, and an uplink jitter parameter.

704. The SMF sends the first link quality reporting request to the terminal. Correspondingly, the terminal receives the first link quality reporting request from the SMF. The first link quality reporting request is used to indicate the terminal to report the quality of service parameter of the service path when the reporting policy is met. Optionally, the first link quality reporting request includes a link quality reporting period. Optionally, the first link quality reporting request includes one or more of a link quality reporting period, a downlink latency threshold, a downlink packet loss rate threshold, and a downlink jitter parameter threshold.

It should be understood that a message format of the first link quality reporting request in step 703 may be the same as a message format of the first link quality reporting request in step 704, and carried content may not be completely the same. For example, an uplink threshold is sent for the UPF, and a downlink threshold is sent for the terminal, but both requests carry an ID of the monitoring link, for example, an LQAP ID.

It should be further understood that the foregoing description is provided only by using an example in which the uplink threshold is sent for the UPF and the downlink threshold is sent for the terminal. Alternatively, both the uplink threshold and the downlink threshold may be sent to the UPF or the terminal. This is not limited.

705. The terminal and the UPF perform link quality detection.

Herein, that the terminal and the UPF perform link quality detection includes: the terminal and the UPF send detection packets to each other, and determine link quality based on arrival statuses of the detection packets. Specifically, for example, the terminal is a transmit end and the UPF is a receive end. When a monitoring link is established between the terminal and the UPF, the terminal sends a detection packet to the UPF. The UPF receives, based on an expected acceptance rule, the detection packet sent by the terminal. The UPF may determine quality of the monitoring link by comparing an arrival of the detection packet with the expected acceptance rule. It should be understood that the transmit end and the receive end may be interchanged, that is, both the terminal and the UPF can detect the quality of the monitoring link. This is not limited in this embodiment of this application.

706. The terminal sends a first link quality notification message to the SMF. Correspondingly, the SMF receives the first link quality notification message from the terminal. The first link quality notification message includes one or more of a downlink latency parameter, a downlink packet loss rate, and a downlink jitter parameter. Optionally, specific content reported by the terminal to the SMF may correspond to the threshold received in step 704. Optionally, the terminal performs periodic reporting based on the link quality reporting period.

707. The UPF sends a first link quality notification message to the SMF. Correspondingly, the SMF receives the first link quality notification message from the UPF.

The first link quality notification message includes one or more of an uplink latency parameter, an uplink packet loss rate, and an uplink jitter parameter. Optionally, specific content reported by the UPF to the SMF may correspond to the threshold received in step 704. Optionally, the UPF performs periodic reporting based on the link quality reporting period.

708. The SMF sends a second link quality notification message to the AF. Correspondingly, the AF receives the second link quality notification message.

The SMF may send the content received in step 706 and/or step 707 to the AF, so that the AF learns of the quality of service parameter.

709. The SMF determines that a reporting policy needs to be updated.

The SMF may determine, based on a quality of service requirement of a service, that the reporting policy needs to be updated. Alternatively, the SMF may determine, based on an indication of the AF, that the reporting policy needs to be updated. Optionally, before step 709, the SMF receives the second update message sent by the AF, and then determines, based on the second update message, that the reporting policy needs to be updated.

710. The AF sends a second update message to the SMF. Correspondingly, the SMF receives the second update message. The second update message carries the identifier of the service. The second update message includes one or more of a reporting period update value, an uplink latency threshold update value, an uplink packet loss rate threshold update value, and an uplink jitter threshold update value.

711. The SMF sends a first update message to the UPF. Correspondingly, the UPF receives the first update message.

The first update message is used to indicate the UPF to update the reporting policy. Optionally, the first update message includes one or more of a link quality reporting period update value, an uplink latency threshold update value, an uplink packet loss rate threshold update value, and an uplink jitter threshold update value.

712. The SMF sends a first update message to the terminal. Correspondingly, the terminal receives the first update message.

The first update message is used to indicate the terminal to update the reporting policy. Optionally, the first update message includes one or more of a link quality reporting period update value, a downlink latency threshold update value, a downlink packet loss rate threshold update value, and a downlink jitter threshold update value.

It should be understood that a message format of the first update message in step 711 may be the same as a message format of the first update message in step 712, and carried content may not be completely the same. For example, an uplink threshold is sent for the UPF, and a downlink threshold is sent for the terminal, but both requests carry an ID of the monitoring link, for example, an LQAP ID.

It should be noted that the SMF may determine the monitoring link based on the indication of the AF (step 701), or the SMF may determine the monitoring link based on an indication of the PCF. For example, before step 702, step 713 is performed, that is, the PCF sends reporting indication information to the SMF.

The reporting indication information is used to indicate to report the quality of service parameter. The reporting indication information includes the identifier of the service corresponding to the service path. Optionally, the SMF may determine the monitoring link based on the reporting indication information sent by the PCF.

In this embodiment of this application, the SMF determines the monitoring link, and notifies UE and the UPF to report the quality of service parameter of the monitoring link when the reporting policy is met, so that network performance can be learned of in real time. Further, the SMF may further update the reporting policy. The SMF may report, to the AF, the quality of service parameter reported by the UE and the UPF, so that the AF can also learn of the quality of service parameter in real time. This helps improve a capability of the AF to perceive network performance, so that the AF can highly cooperate with a 5G network.

Figure 8:
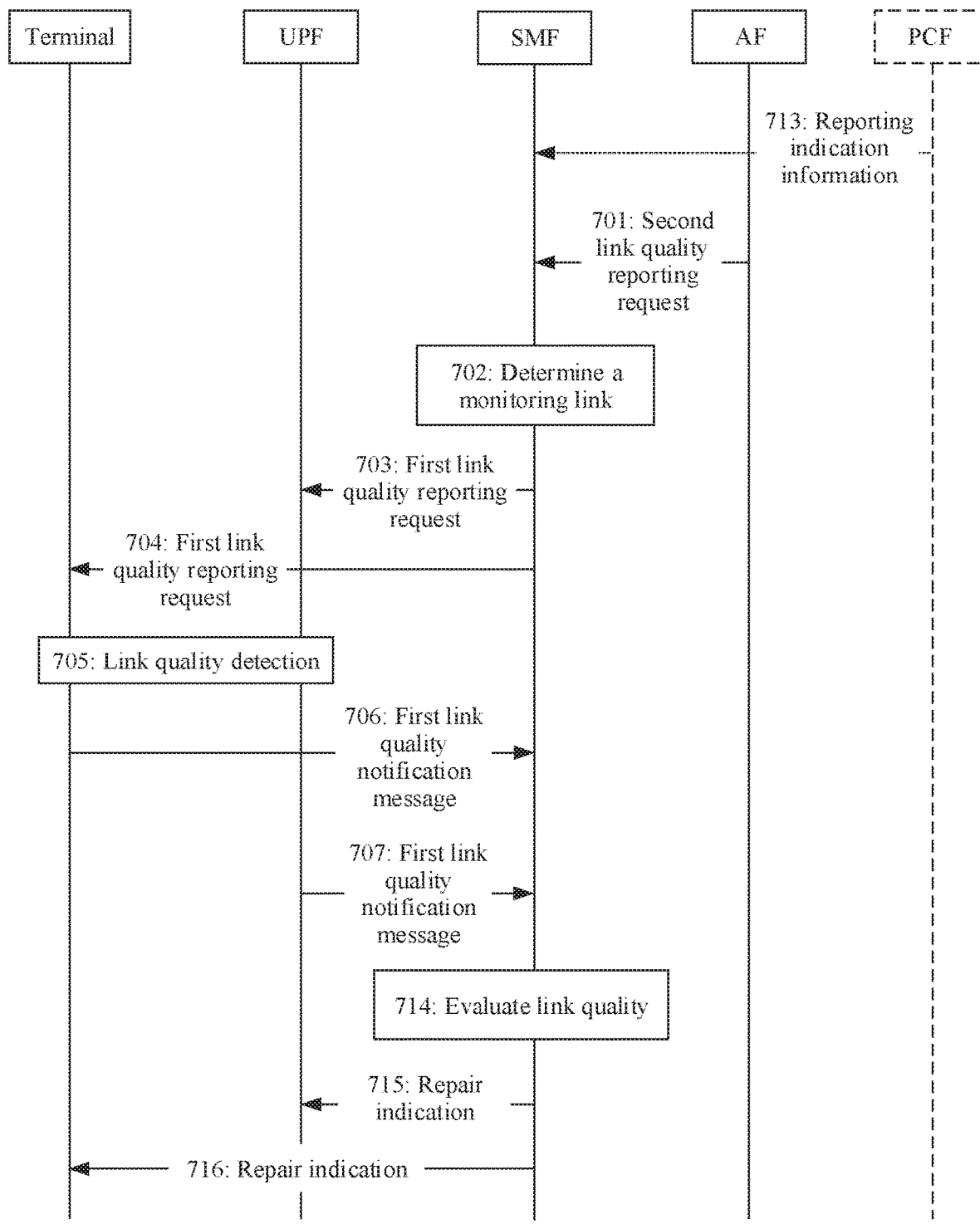
FIG. 8 is a schematic diagram of another example according to an embodiment of this application.

FIG. 8 is a schematic diagram of another example according to an embodiment of this application. As shown in FIG. 8, actions performed in steps 701 to 707 and 713 are the same as those performed in the steps in FIG. 7. For brevity, details are not described herein again. A difference lies in that the foregoing example may further include the following steps.

714. The SMF evaluates link quality.

The SMF may evaluate the link quality of the monitoring link based on the quality of service parameter reported by the terminal and/or the UPF.

715. The SMF sends a repair indication to the UPF. Correspondingly, the UPF receives the repair indication from the SMF. The repair indication is used to indicate the UPF to optimize or repair the service path.

716. The SMF sends a repair indication to the terminal. Correspondingly, the terminal receives the repair indication from the SMF. The repair indication is used to indicate the terminal to optimize or repair the service path. For a specific repair process, refer to the foregoing description.

It should be understood that the examples in FIG. 7 and FIG. 8 are merely intended to help a person skilled in the art understand the embodiments of this application, but are not intended to limit the embodiments of this application to specific scenarios of the examples. A person skilled in the art can apparently make various equivalent modifications or changes based on the examples shown in FIG. 7 to FIG. 8, and such modifications or changes also fall within the scope of the embodiments of this application.

In this embodiment of this application, the SMF evaluates the link quality of the monitoring link, to optimize a transmission link or a bearer between the UE and the UPF, thereby ensuring normal service transmission.

It should be understood that the solutions in the embodiments of this application may be combined for use, and explanations or descriptions of terms in the embodiments may be cross-referenced or explained in the embodiments. This is not limited.

The foregoing describes the link quality obtaining method according to the embodiments of this application, and the following describes an apparatus according to the embodiments of this application.

Figure 9:
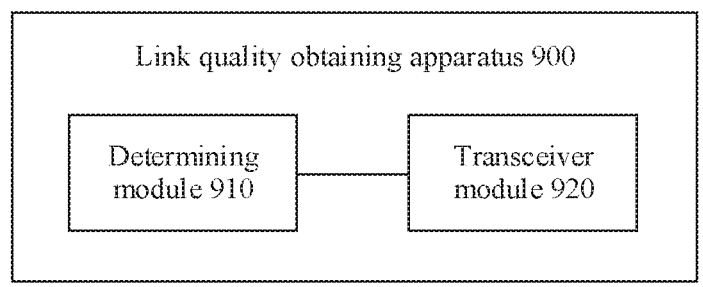
FIG. 9 is a schematic block diagram of a link quality obtaining apparatus according to an embodiment of this application.

FIG. 9 is a schematic block diagram of a link quality obtaining apparatus 900 according to an embodiment of this application. Optionally, a specific form of the apparatus 900 may be a general-purpose computer device or a chip in a general-purpose computer device. This is not limited in this embodiment of this application. The apparatus 900 is a session management network element, and the apparatus 900 includes:

a determining module 910, configured to determine a monitoring link, where the monitoring link is used to detect quality of service of a service path between a first communications device and a second communications device; and a transceiver module 920, configured to send a first link quality reporting request to a first device, where the first link quality reporting request is used to indicate the first device to report quality of service information of the service path when a reporting policy is met, and the first device includes the first communications device and/or the second communications device.

The transceiver module 920 is further configured to receive a first link quality notification message from the first device, where the first link quality notification message includes the quality of service information and an identifier of the monitoring link.

Optionally, the quality of service information includes a quality of service parameter and/or a link status notification message, and the link status notification message is used to indicate that the quality of service parameter of the service path meets the reporting policy.

Optionally, the quality of service information is obtained by the first communications device or the second communications device by sending a detection packet.

Optionally, the first link quality reporting request includes a link quality reporting period. The reporting policy indicates that the first device reports the quality of service information based on the link quality reporting period.

Optionally, when the quality of service information is the quality of service parameter of the service path, that the first device meets the reporting policy indicates that the first device detects that the quality of service parameter meets one or more of the following conditions:

a latency parameter of the service path is greater than or equal to a latency threshold, where the quality of service parameter includes the latency parameter:

a packet loss rate of the service path is greater than or equal to a packet loss rate threshold, where the quality of service parameter includes the packet loss rate; and a jitter parameter of the service path is greater than or equal to a jitter threshold, where the quality of service parameter includes the jitter parameter.

Optionally, the latency threshold, the packet loss rate threshold, or the jitter threshold is determined by the first device based on a service requirement. Alternatively, the first link quality reporting request includes one or more of the latency threshold, the packet loss rate threshold, and the jitter threshold.

Optionally, the latency threshold includes an uplink latency threshold and/or a downlink latency threshold. The packet loss rate threshold includes an uplink packet loss rate threshold and/or a downlink packet loss rate threshold. The jitter threshold includes an uplink jitter threshold and/or a downlink jitter threshold.

Optionally, the transceiver module 920 is further configured to receive a second link quality reporting request from an application network element, where the second link quality reporting request includes an identifier of a service corresponding to the service path.

Correspondingly, that the determining module is configured to determine a monitoring link specifically includes: determining the monitoring link based on the identifier of the service.

Optionally, the transceiver module 920 is further configured to send a second link quality notification message to the application network element, where the second link quality notification message includes the quality of service information.

Optionally, the determining module 910 is further configured to:

when the first link quality notification message is received, determine that a network status is any one of wireless handover, user plane function UPF reselection, and packet data unit PDU session establishment or reestablishment; and determine not to send the second link quality notification message to the application network element.

Optionally, when the first link quality reporting request includes one or more of a link quality reporting period, a latency threshold, a packet loss rate threshold, and a jitter threshold, the determining module 910 is further configured to determine that the reporting policy needs to be updated.

Correspondingly, the transceiver module 920 is further configured to send a first update message to the first device, where the first update message is used to indicate to update the reporting policy, and the first update message includes one or more of a link quality reporting period update value, a latency threshold update value, a packet loss rate threshold update value, and a jitter threshold update value.

Optionally, the transceiver module 920 is further configured to receive a second update message from the application network element, where the second update message carries the identifier of the service, and the second update message includes one or more of a link quality reporting period update value, a latency threshold update value, a packet loss rate threshold update value, and a jitter threshold update value.

Correspondingly, that the determining module 910 is configured to determine that the reporting policy needs to be updated specifically includes:

determining the monitoring link based on the identifier of the service; and determining that the reporting policy of the monitoring link needs to be updated.

Optionally, that the determining module 910 is configured to determine a monitoring link specifically includes: determining, based on a quality of service requirement of a service, an identifier of a service corresponding to the service path; and determining the monitoring link based on the identifier of the service.

Optionally, the transceiver module 920 is further configured to receive reporting indication information from a policy control network element, where the reporting indication information is used to indicate to report the quality of service information.

Correspondingly, that the determining module is configured to determine a monitoring link specifically includes: determining, based on the reporting indication information, an identifier of a service corresponding to the service path; and determining, by the session management network element, the monitoring link based on the identifier of the service.

Optionally, that the determining module is configured to determine the monitoring link based on the identifier of the service specifically includes:

determining, based on the identifier of the service, context information corresponding to the service; and determining the monitoring link based on the context information.

Optionally, the method 900 further includes:

an evaluation module, configured to evaluate link quality of the monitoring link based on the first link quality notification message.

Correspondingly, the transceiver module 920 is configured to send a repair indication to the first device based on an evaluation result, where the repair indication is used to indicate the first device to optimize the service path.

It should be understood that the link quality obtaining apparatus 900 according to this embodiment of this application may correspond to the method of the session management network element in the foregoing method embodiment, and the foregoing and other management operations and/or functions of the modules in the apparatus 900 are respectively intended to implement corresponding steps of the method of the session management network element in the foregoing method embodiment, and therefore, can also implement beneficial effects in the foregoing method embodiment. For brevity, details are not described herein.

It should also be understood that, in this embodiment, the apparatus 900 is presented in a form of a function module. The "module" herein may be an application-specific integrated circuit ASIC, a circuit, a processor that executes one or more software or firmware programs, a memory, an integrated logic circuit, and/or another component that may provide the foregoing functions. In a simple embodiment, a person skilled in the art can figure out that the apparatus 900 may be in the form shown in FIG. 3. The determining module 910 may be implemented by using the processor 301 and the memory 302 shown in FIG. 3. The transceiver module 920 may be implemented by using the transceiver 303 shown in FIG. 3. Specifically, the processor is implemented by executing a computer program stored in the memory. Optionally, when the apparatus 900 is a chip, a function and/or an implementation process of the transceiver module 920 may be alternatively implemented by using a pin or a circuit. Optionally, the memory is a storage unit in the chip, for example, a register or a cache. The storage unit may alternatively be a storage unit, such as the memory 302 shown in FIG. 3, that is in the computer device and that is located outside the chip. A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

Figure 10:
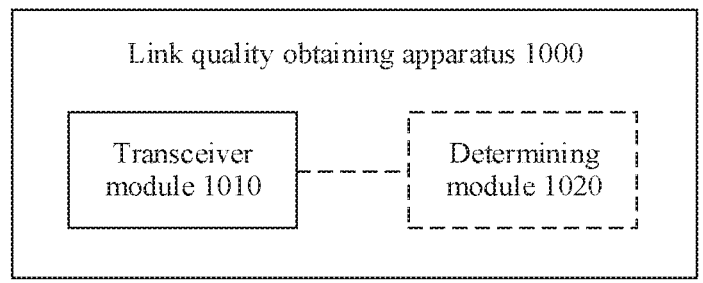
FIG. 10 is a schematic block diagram of a link quality obtaining apparatus according to another embodiment of this application.

FIG. 10 is a schematic block diagram of a link quality obtaining apparatus 1000 according to an embodiment of this application. Optionally, a specific form of the apparatus 1000 may be a general-purpose computer device or a chip in a general-purpose computer device. This is not limited in this embodiment of this application. The apparatus 1000 is a first device, and the apparatus 1000 includes:

a transceiver module 1010, configured to receive a first link quality reporting request from a session management network element, where the first link quality reporting request is used to indicate the first device to report quality of service information of a service path when it is detected that a monitoring link meets a reporting policy, and the monitoring link is used to detect quality of service of a service path between the first device and a peer end of the first device.

The transceiver module 1010 is further configured to send a first link quality notification message to the session management network element when the reporting policy is met, where the first link quality notification message includes the quality of service information and an identifier of the monitoring link.

Optionally, the quality of service information includes a quality of service parameter and/or a link status notification message, and the link status notification message is used to indicate that the quality of service parameter of the service path meets the reporting policy.

Optionally, the apparatus 1000 further includes a determining module 1020, configured to determine the quality of service information by sending a detection packet to the peer end of the first device.

Optionally, the first link quality reporting request includes a link quality reporting period.

That the transceiver module 1010 sends a first link quality notification message to the session management network element when the reporting policy is met specifically includes: sending the first link quality notification message to the session management network element based on the link quality reporting period.

Optionally, the quality of service information is a quality of service parameter of the service path, and that the transceiver module 1010 sends, by the first device, a first link quality notification message to the session management network element when the reporting policy is met specifically includes:

sending the first link quality notification message to the session management network element when the first device detects that the quality of service parameter meets one or more of the following conditions:

a latency parameter of the service path is greater than or equal to a latency threshold, where the quality of service parameter includes the latency parameter:

a packet loss rate of the service path is greater than or equal to a packet loss rate threshold, where the quality of service parameter includes the packet loss rate; and a jitter parameter of the service path is greater than or equal to a jitter threshold, where the quality of service parameter includes the jitter parameter.

Optionally, the latency threshold, the packet loss rate threshold, or the jitter threshold is determined by the first device based on a service requirement. Alternatively, the first link quality reporting request includes one or more of the latency threshold, the packet loss rate threshold, and the jitter threshold.

Optionally, the latency threshold includes an uplink latency threshold and/or a downlink latency threshold. The packet loss rate threshold includes an uplink packet loss rate threshold and/or a downlink packet loss rate threshold. The jitter threshold includes an uplink jitter threshold and/or a downlink jitter threshold.

Optionally, when the first link quality reporting request includes one or more of a link quality reporting period, a latency threshold, a packet loss rate threshold, and a jitter threshold, the transceiver module 1010 is further configured to receive a first update message from the session management network element, where the first update message is used to indicate to update the reporting policy, and the first update message includes one or more of a link quality reporting period update value, a latency threshold update value, a packet loss rate threshold update value, and a jitter threshold update value.

Optionally, the transceiver module 1010 is further configured to receive a repair indication from the session management network element, where the repair indication is used to indicate the first device to optimize the service path. The apparatus further includes an optimization module, configured to optimize the service path.

Optionally, the apparatus 1000 is a terminal or a user plane function UPF network element.

It should be understood that the link quality obtaining apparatus 1000 according to this embodiment of this application may correspond to the method of the first device in the foregoing method embodiment, and the foregoing and other management operations and/or functions of the modules in the apparatus 1000 are respectively intended to implement corresponding steps of the method of the first device in the foregoing method embodiment, and therefore, can also implement beneficial effects in the foregoing method embodiment. For brevity, details are not described herein.

It should also be understood that, in this embodiment, the apparatus 1000 is presented in a form of a function module. The "module" herein may be an application-specific integrated circuit ASIC, a circuit, a processor that executes one or more software or firmware programs, a memory, an integrated logic circuit, and/or another component that may provide the foregoing functions. In a simple embodiment, a person skilled in the art can figure out that the apparatus 1000 may be in the form shown in FIG. 3. The determining module 1020 may be implemented by using the processor 301 and the memory 302 shown in FIG. 3. The transceiver module 1010 may be implemented by using the transceiver 303 shown in FIG. 3. Specifically, the processor is implemented by executing a computer program stored in the memory. Optionally, when the apparatus 1000 is a chip, a function and/or an implementation process of the transceiver module 1020 may be alternatively implemented by using a pin or a circuit. Optionally, the memory is a storage unit in the chip, for example, a register or a cache. The storage unit may alternatively be a storage unit, such as the memory 302 shown in FIG. 3, that is in the computer device and that is located outside the chip. A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

Unless otherwise specified, an expression used in this application similar to an expression that "an item includes at least one of the following: A, B, and C" usually means that the item may be any one of the following cases: A; B; C; A and B; A and C; B and C; A, B, and C; A and A; A, A, and A; A, A, and B; A, A, and C; A, B, and B; A, C, and C; B and B; B, B, and B; B, B, and C; C and C; C, C and C; and other combinations of A, B and C. The foregoing uses a total of three elements A, B. and C as an example to describe an optional case of the item. When the expression is "the item includes at least one of the following: A, B, . . . , and X", in other words, more elements are included in the expression, a case to which the item is applicable may also be obtained according to the foregoing rule.

It should be understood that sequence numbers of the foregoing processes do not mean execution sequences in various embodiments of this application. The execution sequences of the processes should be determined based on functions and internal logic of the processes, and should not be construed as any limitation on the implementation processes of the embodiments of this application.

It should also be understood that the numbers "first" and "second" in the embodiments of this application are only for distinguishing different objects, for example, distinguishing different "link quality requests", or distinguishing different "communications devices", and do not constitute any limitation on the embodiments of this application.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of this application. The foregoing storage medium includes: any medium that can store program code, such as a USB flash drive, a removable hard disk, a read-only memory ROM, a random access memory RAM, a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

The invention claimed is:

1. A method, comprising:
   determining, by a session management apparatus, a monitoring link to trigger per quality of service (QoS) flow QoS monitoring of a service path between a user plane apparatus and a terminal, wherein the service path is a QoS flow identified by a QoS flow identifier;
   sending, by the session management apparatus, a request to the user plane apparatus, wherein the first link quality request indicates the user plane apparatus to report QoS information of the QoS flow in response to one or more reporting conditions being satisfied, wherein the one or more reporting conditions comprise a condition that a latency parameter of the QoS flow is greater than or equal to a latency threshold, wherein the request comprises the QoS flow identifier indicating the QoS flow for the per QoS flow QoS monitoring and the latency threshold indicating a threshold for a downlink packet delay or an uplink packet delay;
   receiving, by the user plane apparatus, the request;
   performing, by the user plane apparatus, the per QoS flow QoS monitoring based on the request
   sending, by the user plane apparatus, a notification to the session management apparatus in response to that a monitored delay of the QoS flow is greater than or equal to the latency threshold, wherein the notification comprises the the QoS flow identifier and the monitored delay of the QoS flow; and
   receiving, by the session management apparatus, the notification.

2. The method according to claim 1, wherein the per QoS flow QoS monitoring is for an ultra reliable low latency communication (URLLC) service.

3. The method according to claim 1, wherein performing the per QoS flow QoS monitoring comprises:
   sending, by the user plane apparatus, a downlink packet of the QoS flow.

4. The method according to claim 1, wherein the request comprises a link quality reporting period for periodic reporting, and wherein the user plane apparatus reports the QoS information based on the link quality reporting period.

5. The method according to claim 4, wherein the notification is sent to the session management apparatus based on the link quality reporting period.

6. The method according to claim 1, wherein the QoS information comprises the latency parameter.

7. A communications system, comprising:
   a session management apparatus and a user plane apparatus;
   the session management apparatus comprises:
      at least one first processor; and
      at least one first memory coupled to the at least one first processor and storing first programming instructions for execution by the at least one first processor, the first programming instructions instruct the session management apparatus to:
         determine a monitoring link to trigger per quality of service (QoS) flow QoS monitoring of a service path between the user plane apparatus and a terminal, wherein the service path is a QoS flow identified by a QoS flow identifier; and
         send a request to the user plane apparatus, wherein the request indicates the user plane apparatus to report QoS information of the QoS flow in response to one or more reporting conditions being satisfied, wherein the one or more reporting conditions comprise a condition that a latency parameter of the QoS flow is greater than or equal to a latency threshold, wherein the request comprises the QoS flow identifier indicating the QoS flow for the per QoS flow QoS monitoring and the latency threshold indicating a threshold for a downlink packet delay or an uplink packet delay;
   user plane apparatus comprises:
      at least one second processor; and
      at least one second memory coupled to the at least one second processor and storing second programming instructions for execution by the at least one second processor, the second programming instructions instruct the user plane apparatus to:
         perform the per QoS flow QoS monitoring based on the request;
         receive the request; and
         send a notification to the session management apparatus in response to that a monitored delay of the QoS flow is greater than or equal to the latency threshold, wherein the notification comprises the monitored delay of the QoS flow and the QoS flow identifier.

8. The communications system according to claim 7, wherein the QoS information comprises the latency parameter.

9. The communications system according to claim 7, wherein the per QoS flow QoS monitoring is for an ultra reliable low latency communication (URLLC) service.

10. The communications system according to claim 7, wherein the second programming instructions further instruct the user plane apparatus to:
obtain the QoS information based on sending a detection packet.

11. The communications system according to claim 10, wherein the detection packet is sent by the user plane apparatus to the terminal.

12. The communications system according to claim 7, wherein the request comprises a link quality reporting period for periodic reporting, and the notification is sent to the session management apparatus based on the link quality reporting period.

13. The communications system according to claim 7, wherein the second programming instructions instruct the user plane apparatus to perform the per QoS flow QoS monitoring based on the request by operations comprising:
sending, by the user plane apparatus, a downlink packet of the QoS flow.

14. A session management apparatus, comprising:
at least one processor, and
at least one memory coupled to the at least one processor and storing programming instructions for execution by the at least one processor, the programming instructions instruct the session management apparatus to:
determine a monitoring link to trigger per quality of service (QoS) flow QoS monitoring of a service path between a user plane apparatus and a terminal, wherein the service path is a QoS flow identified by a QoS flow identifier;
send a request to the user plane apparatus, wherein the request indicates the user plane apparatus to report QoS information of the QoS flow in response to one or more reporting conditions being satisfied, wherein the one or more reporting conditions comprise a condition that a latency parameter of the QoS flow is greater than or equal to a latency threshold, wherein the request comprises the QoS flow identifier indicating the QoS flow for the per QoS flow QoS monitoring and the latency threshold indicating a threshold for a downlink packet delay or an uplink packet delay; and
receive a notification message from the user plane apparatus, wherein the notification message comprises the QoS flow identifier and a monitored delay of the QoS flow that is greater than or equal to the latency threshold.

15. The session management apparatus according to claim 14, wherein the QoS information comprises the latency parameter.

16. The session management apparatus according to claim 14, wherein the request comprises a link quality reporting period for periodic reporting, and wherein the user plane apparatus reports the QoS information based on the link quality reporting period.

17. The session management apparatus according to claim 14, wherein the per QoS flow QoS monitoring is for an ultra reliable low latency communication (URLLC) service.

18. A method for identifying link quality, comprising:
determining, by a session management apparatus, a monitoring link to trigger per quality of service (QoS) flow QoS monitoring of a service path between a user plane apparatus and a terminal, wherein the service path is a QoS flow identified by a QoS flow identifier;
sending, by the session management apparatus, a request to the user plane apparatus, wherein the request indicates the user plane apparatus to report QoS information of the QoS flow in response to one or more reporting conditions being satisfied, wherein the one or more reporting conditions comprise a condition that a latency parameter of the QoS flow is greater than or equal to a latency threshold, wherein the request comprises the QoS flow identifier indicating the QoS flow for the per QoS flow QoS monitoring and the latency threshold indicating a threshold for a downlink packet delay or an uplink packet delay; and
receiving, by the session management apparatus from the user plane apparatus, a notification message, wherein the notification message comprises the QoS flow identifier and a monitored delay of the QoS flow that is greater than or equal to the latency threshold.

19. The method according to claim 18, wherein the request comprises a link quality reporting period for periodic reporting, and wherein the user plane apparatus reports the QoS information based on the link quality reporting period.

20. The method according to claim 18, wherein the QoS information comprises the latency parameter.

21. The method according to claim 18, wherein the per QoS flow QoS monitoring is for an ultra reliable low latency communication (URLLC) service.

* * * * *

UNITED STATES PATENT AND TRADEMARK OFFICE
CERTIFICATE OF CORRECTION

PATENT NO. : 11,943,662 B2
APPLICATION NO. : 16/985926
DATED : March 26, 2024
INVENTOR(S) : Dekui Sun It is certified that error appears in the above-identified patent and that said Letters Patent is hereby corrected as shown below:

In the Claims

Column 37, Line 57-58, Claim 1, after "wherein the" please delete "first link quality";

Column 38, Line 3, Claim 1, after "request" insert therefore -- ; --;

Column 38, Line 8, Claim 1, please delete "the the" and insert therefore -- the --;

Column 38, Line 55, Claim 7, before "user" insert therefore -- the --.

Signed and Sealed this
Twenty-fifth Day of June, 2024

Katherine Kelly Vidal
*Director of the United States Patent and Trademark Office*